(12) United States Patent
Matsuura et al.

(10) Patent No.: US 8,902,437 B1
(45) Date of Patent: Dec. 2, 2014

(54) IMAGE FORMING SYSTEM, METHOD FOR CONTROLLING IMAGE FORMING SYSTEM AND NON-TRANSITORY COMPUTER READABLE STORAGE MEDIUM STORING PROGRAM FOR CONTROLLING IMAGE FORMING SYSTEM

(71) Applicant: Konica Minolta, Inc., Tokyo (JP)

(72) Inventors: Tsumoru Matsuura, Toyohashi (JP); Yoshihisa Kamata, Hadano (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/331,798

(22) Filed: Jul. 15, 2014

(30) Foreign Application Priority Data

Jul. 16, 2013 (JP) ................................. 2013-147902

(51) Int. Cl.
*H04N 1/04* (2006.01)
*G06K 15/16* (2006.01)
*B65H 7/20* (2006.01)

(52) U.S. Cl.
CPC . *G06K 15/16* (2013.01); *B65H 7/20* (2013.01)
USPC .......... 358/1.12; 358/1.15; 358/474; 358/505

(58) Field of Classification Search
USPC ................................. 358/1.12, 1.15, 474, 505
See application file for complete search history.

(56) References Cited

U.S. PATENT DOCUMENTS 8,746,693 B2 * 6/2014 Miyazawa .................... 271/251

FOREIGN PATENT DOCUMENTS

| JP | 2012-076883 A | 4/2012 |
| JP | 2012-082052 A | 4/2012 |
| JP | 2012-101872 A | 5/2012 |
| JP | 2012-111619 A | 6/2012 |
| JP | 2012-143899 A | 8/2012 |

* cited by examiner

*Primary Examiner* — Houshang Safaipour
(74) *Attorney, Agent, or Firm* — Lucas & Mercanti, LLP

(57) ABSTRACT

Disclosed is an image forming system in which a paper sheet processing is accurately implemented without being influenced by a shrinkage of the paper sheet. The system includes a paper sheet feeding section, an image processing section, an image forming section, a paper sheet processing section and a control section. The control section accepts a paper sheet reference position designated at a position within the paper sheet and a designated distance designated as a distance from the paper sheet reference position to the paper-sheet processing implementation position, to control the paper sheet feeding operation so as to make the apparatus reference position and the paper sheet reference position coincide with each other, and further, controls the image processing section to set an rotation angle of the image at a value that makes a paper-sheet conveyance direction, an image forming direction and a paper sheet processing direction, coincide with each other.

15 Claims, 12 Drawing Sheets

IMAGE FORMING SYSTEM, METHOD FOR CONTROLLING IMAGE FORMING SYSTEM AND NON-TRANSITORY COMPUTER READABLE STORAGE MEDIUM STORING PROGRAM FOR CONTROLLING IMAGE FORMING SYSTEM

This application is based on Japanese Patent Application NO. 2013-147902 filed on Jul. 16, 2013, with the Japan Patent Office, the entire content of which is hereby incorporated by reference.

BACKGROUND OF THE INVENTION

1. Field of the Invention

The present invention relates to an image forming system, a method for controlling an image forming system and a non-transitory computer readable storage medium that stores a program for controlling an image forming system, and specifically relates to controlling operations for appropriately implementing a paper sheet processing in an image forming system.

2. Description of Related Art

Recently, various kinds of image forming systems in each of which an image forming apparatus and at least one of various kinds of paper sheet processing apparatuses are coupled to each other has been increasingly proliferated in the printing field. This kind image forming system makes it possible to implement various kinds of bookbinding processing, and can be employed as a printing apparatus. For instance, the saddle stitch bookbinding can be achieved by applying a staple processing to a folded portion of a middle-fold bunch of paper sheets, which is created by folding a bunch of paper sheets along a center line thereof. Further, the spine portion can be created by applying a pressure onto the folded portion of the saddle-stitched bunch of paper sheets so as to create two fold lines that may form a rectangular shaped spine portion. The above-mentioned processing for forming the spine portion of the bunch of paper sheets is called a "spine processing", which makes the bunch of paper sheets in a state similar to a "perfect binding".

Further, as a pre-processing to be applied before forming the fold line above-mentioned, a creasing apparatus, called a creaser, is employed for applying a crease processing to the position onto which the fold line is planned to be formed so as to form a crease thereon. Then, by applying the fold processing to the bunch of paper sheets after the crease processing has been completed, it is possible to advantageously prevent the folded portion from swelling up, even when the fold processing is applied thereto in a state of bundling a plurality of paper sheets.

In addition, by implementing the crease processing before forming the fold line as above-mentioned, it is also possible to acquire such an effect that toner, forming a partial image on the folded portion of the paper sheet, is prevented from peeling off therefrom.

In this connection, with respect to the crease processing as aforementioned, each of Japanese Patent Application Laid-Open Publication No. 2012-111619, Japanese Patent Application Laid-Open Publication No. 2012-101872, Japanese Patent Application Laid-Open Publication No. 2012-82052, Japanese Patent Application Laid-Open Publication No. 2012-76883, Japanese Patent Application Laid-Open Publication No. 2012-143899, etc., sets forth various kinds of the related technologies.

In the crease processing described in the foregoing, due to the relationship with the arrangement of the image formed on the paper sheet, a paper sheet reference position (one side of the paper sheet) of the paper sheet is designated. Then, the crease attaching position is designated by using a designated distance "d" defined as a distance between the paper sheet reference position and the crease attaching position.

Successively, the paper sheet processing apparatus makes an apparatus reference position of a stopper or the like coincide with the paper sheet reference position designated, and then, moves a crease attaching unit to a position being apart from the stopper by the designated distance "d", so as to make the crease attaching unit implement the crease processing at the moved position.

However, depending on the image forming system actually installed, sometimes, such a case that it is impossible to coincide the apparatus reference position with the paper sheet reference position, above-designated, may occur, due to the direction of paper sheets currently accommodated into the paper sheet feeding section and/or the relationship with another paper sheet processing. Incidentally, herein, it is assumed that a paper sheet length in the same direction of the designated distance "d", above-mentioned, is established as "D". In such the case as above-mentioned, the crease processing can be implemented by making the other side line, being opposite to the paper sheet reference position (inclined angle between them is 180°), coincide with the apparatus reference position of a stopper or the like, and then, moving the crease attaching unit to a position being apart from the stopper by distance "D-d".

In this connection, generally speaking, in almost of all cases, one side of the paper sheet, which is nearest to the crease attaching position, is established as the paper sheet reference position. In this case, even if the fixing process causes a shrinkage of the paper sheet size (hereinafter, also referred to as a paper sheet size-shrinkage), an error in the crease attaching position is relatively small. On the other hand, in a case where the crease processing is implemented by making the other side line, being opposite to the paper sheet reference position designated (inclined angle between them is 180°), coincide with the apparatus reference position, and then, moving the crease attaching unit to a position being apart from the stopper by distance "D-d", the paper sheet size-shrinkage, caused by the fixing process, would considerably influence the crease attaching position to a greater degree than the above case. As a result, the error in the crease attaching position may be getting larger than ever.

For instance, let us assume such a case that the paper sheet processing is to be applied at a position being apart from the paper sheet reference position by 10 mm. In this case, assuming that the paper sheet size is shrunk to the 4% reduced size due to the heat applied to the paper sheet for achieving the fixing operation, the amount of influence, generated at the paper-sheet processing implementation position, is estimated as 10×0.04=0.4 mm.

On the other hand, assuming that the paper sheet length is 297 mm, in a case of implementing the paper sheet processing by employing the other side line, being opposite to the paper sheet reference position designated, as the apparatus reference position, it is necessary to apply the paper sheet processing at a position being apart from the opposite side by the distance estimated as 297 mm-10 mm=287 mm, whereas the reduced paper sheet length after the shrinkage is estimated as 297×(1-0.04)=285.12 mm. Accordingly, since the position at 287 mm is out of range of the paper sheet area, arisen is such a problem that it is virtually impossible to implement the paper sheet processing concerned.

Alternatively, in a case where the paper sheet length is 297 mm and the paper sheet processing is implemented by employing the other opposite side as the apparatus reference position, it is necessary to apply the paper sheet processing to the position being apart from the opposite side by the distance estimated as 297 mm-10 mm=287 mm. Herein, assuming that the paper sheet size is shrunk to the 3% reduced size due to the heat applied to the paper sheet for achieving the fixing operation, the reduced paper sheet length after the shrinkage is estimated as 297×(1-0.03)=288 mm. Owing to this reason, the paper sheet processing is actually applied to the position of 287 mm relative to the total length of 288 mm of the paper sheet, namely, to the position being apart from the edge portion of the concerned paper sheet by 1 mm.

In this connection, degree of the paper sheet size-shrinkage, caused by the fixing process, varies depending on the fixing temperature and the kind of paper sheet. For this reason, it is impossible to correctly estimate a size change of the paper sheet in advance. Accordingly, in a case where the paper sheet processing is implemented by employing the other side of the paper sheet, being opposite to the paper sheet reference position, as the apparatus reference position, arisen is a problem that it becomes impossible to correctly manage the paper-sheet processing implementation position.

Further, although Japanese Patent Application Laid-Open Publication No. 2012-11619, aforementioned, sets forth the controlling operations for controlling the crease processing, no description in regard to the paper-sheet processing implementation position or the various kinds of reference positions as described in the foregoing can be found therefrom (in other words, the concerned Publication pays no attention to the above-mentioned aspects).

Still further, although Japanese Patent Application Laid-Open Publication No. 2012-82052, aforementioned, includes the descriptions in regard to the operations for controlling the conveyance paths of both the paper sheet to which the crease processing is to be applied and the other paper sheet to which no crease processing is to be applied, the concerned Publication pays no attention to the paper-sheet processing implementation position or the various kinds of reference positions as described in the foregoing.

Still further, although Japanese Patent Application Laid-Open Publication No. 2012-76883, aforementioned, includes the descriptions in regard to the operations for heightening the matching aspects between the crease processing and the other kinds of paper sheet processing, the concerned Publication pays no attention to the paper-sheet processing implementation position or the various kinds of reference positions as described in the foregoing.

Yet further, Japanese Patent Application Laid-Open Publication No. 2012-143899, aforementioned, sets forth the controlling operation for rotating an image at 180° as needed, corresponding to the relationship between the edge portion of the paper sheet, which is to be exposed outside as a result of implementing the three fold processing, and the top-and-bottom of the image concerned. However, Japanese Patent Application Laid-Open Publication No. 2012-143899, concerned, pays no attention to the paper-sheet processing implementation position or the various kinds of reference positions as described in the foregoing.

SUMMARY OF THE INVENTION

To overcome the abovementioned drawbacks in conventional image forming systems, it is one of objects of the present invention to provide an image forming system, a method for controlling an image forming system and a non-transitory computer readable storage medium, each of which makes it possible to accurately apply a paper sheet processing to a designated position of a paper sheet without being influenced by a shrinkage of the paper sheet concerned. Accordingly, at least one of the objects of the present invention can be attained by any one of the image forming systems described as follows.

(1) According to an image forming system reflecting an aspect of the present invention, the image forming system, comprises: a paper sheet feeding section that performs a paper sheet feeding operation for feeding a paper sheet accommodated therein; an image processing section that applies image processing including an image rotation processing to image data representing an image to be formed onto the paper sheet; an image forming section that performs an image forming operation for forming the image represented by processed image data that is acquired by applying the image processing to the image data in the image processing section; a paper sheet processing section that applies a paper sheet processing to the paper sheet at a paper-sheet processing implementation position being apart from an apparatus reference position by a predetermined distance; and a control section that controls the paper sheet feeding operation, the image processing, the image forming operation and the paper sheet processing, which are to be performed by the paper sheet feeding section, the image processing section, the image forming section and the paper sheet processing section, respectively; wherein the control section accepts a paper sheet reference position, which is designated at a position within the paper sheet in relation to an arrangement of the image as a reference for designating the paper-sheet processing implementation position, and a designated distance, which is designated as a distance from the paper sheet reference position to the paper-sheet processing implementation position; and wherein the control section controls the paper sheet feeding operation, performed by the paper sheet feeding section, so as to make the apparatus reference position and the paper sheet reference position coincide with each other; and wherein the control section controls the image processing section to apply the rotation processing to the image data, so as to set an rotation angle of the image at such a value that makes a conveyance direction of the paper sheet fed from the paper sheet feeding section, an image forming direction of the image formed by the image forming section and a paper sheet direction of the paper sheet processed by the paper sheet processing section, coincide with each other.

(2) According to another aspect of the present invention, in the image forming system recited in item 1, a plurality of paper sheet processing, which are to be applied to the paper sheet by the paper sheet processing section, includes a first paper sheet processing, serving as the paper sheet processing, and a second paper sheet processing being different from the paper sheet processing; and, in a case where implementing the second paper sheet processing, the control section determines whether or not it is possible to make the apparatus reference position and the paper sheet reference position coincide with each other, and then, conducts controlling operations for displaying a determination result thereof onto a display section and/or notifying a user of the determination result.

(3) According to still another aspect of the present invention, in the image forming system recited in item 1 or 2, a plurality of paper sheet processing, which are to be applied to the paper sheet by the paper sheet processing section, includes a first paper sheet processing, serving as the paper sheet processing, and a second paper sheet processing being different from the paper sheet processing; and, in a case where implementing the second paper sheet processing, the control section determines whether or not it is possible to make the apparatus reference position and the paper sheet reference position coincide with each other; and, when determining that it is impossible to make the apparatus reference position and the paper sheet reference position coincide with each other, the control section disables any one of the first paper sheet processing and the second paper sheet processing.

(4) According to still another aspect of the present invention, in the image forming system recited in item 1, a plurality of paper sheet processing, which are to be applied to the paper sheet by the paper sheet processing section, includes a first paper sheet processing, serving as the paper sheet processing, and a second paper sheet processing being different from the paper sheet processing; and the control section determines whether or not the paper sheet, to which both the first paper sheet processing and the second paper sheet processing can be applied in a state that the apparatus reference position and the paper sheet reference position are made to coincide with each other, exists in the paper sheet feeding section, and then, conducts controlling operations for displaying a determination result thereof onto a display section and/or notifying a user of the determination result.

(5) According to yet another aspect of the present invention, in the image forming system recited in item 1 or 2, a plurality of paper sheet processing, which are to be applied to the paper sheet by the paper sheet processing section, includes a first paper sheet processing, serving as the paper sheet processing, and a second paper sheet processing being different from the paper sheet processing; and the control section determines whether or not the paper sheet, to which both the first paper sheet processing and the second paper sheet processing can be applied in a state that the apparatus reference position and the paper sheet reference position are made to coincide with each other, exists in the paper sheet feeding section; and, when determining that the paper sheet concerned does not exists in the paper sheet feeding section, the control section disables any one of the first paper sheet processing and the second paper sheet processing.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
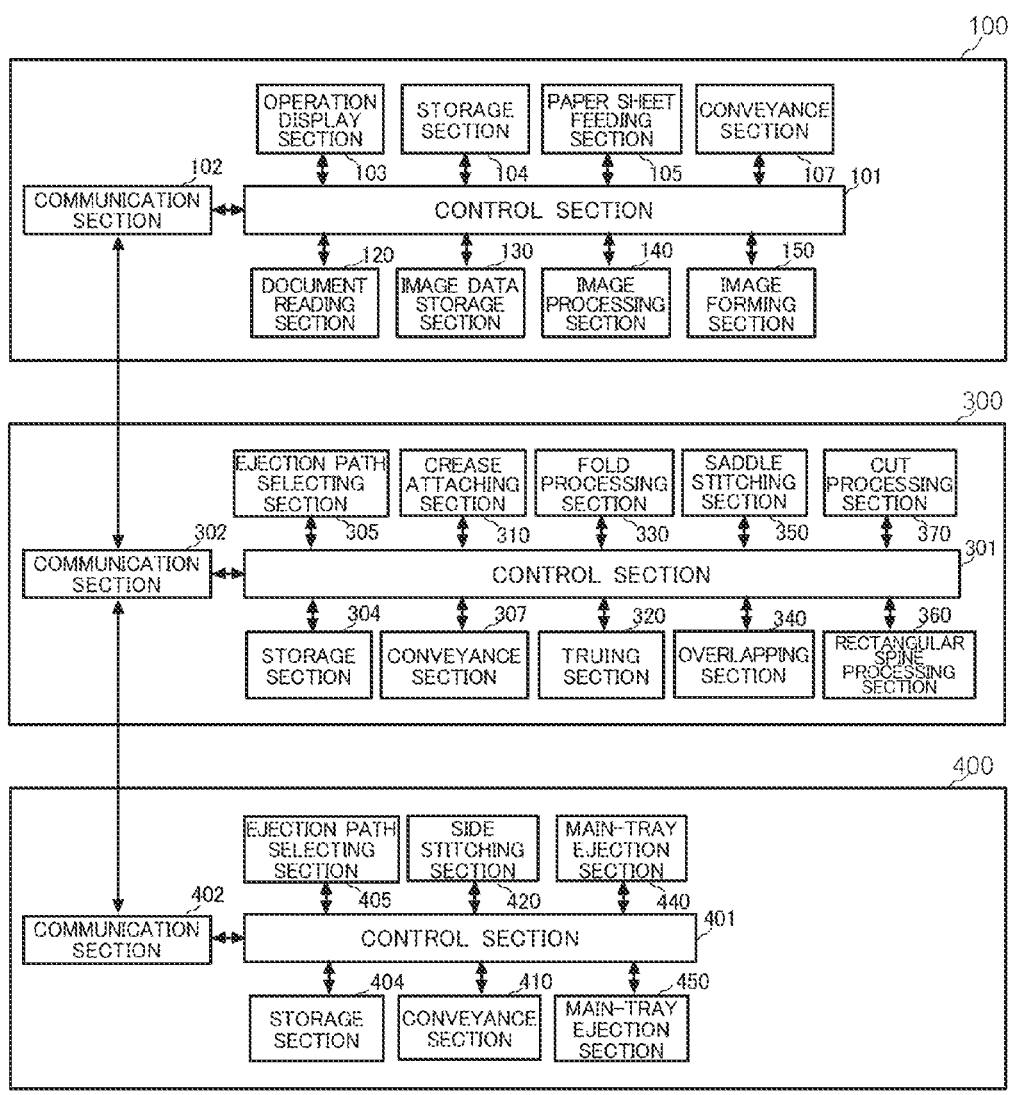
FIG. 1 is a block diagram showing a configuration of an image forming system in accordance with an embodiment of the present invention.

Referring to the drawings, the preferred embodiment in accordance with the present invention will be detailed in the following.

Overall Configuration of Image Forming System

Now, referring to the schematic diagrams shown in FIG. 1 and FIG. 2, a configuration of an image forming system, which is provided with a paper sheet processing apparatus in accordance with the embodiment of the present invention, will be detailed in the following. As indicated in the schematic diagrams shown in FIG. 1 and FIG. 2, the image forming system is provided with an image forming apparatus 100; a first paper-sheet processing apparatus 300; and a second paper-sheet processing apparatus 400. In this connection, it is also applicable that another apparatus is installed at a position residing between the image forming apparatus 100 and the first paper-sheet processing apparatus 300, and/or the second paper-sheet processing apparatus 400 is not installed. Further, still another paper-sheet processing apparatus may be coupled to the system as a further later stage thereof.

Alternatively, it is also possible to further apply another paper sheet processing to the image-bearing paper sheet onto which the image forming operation and the paper sheet processing have been already applied in the image forming system constituted by the image forming apparatus 100 and the first paper-sheet processing apparatus 300, by employing another paper sheet processing apparatus (not shown in the drawings), which is not coupled to the image forming system concerned (standalone apparatus).

The image forming apparatus 100 is constituted by a control section 101, a communication section 102, an operation display section 103, a storage section 104, a paper sheet feeding section 105, a conveyance section 107, a document reading section 120, an image data storage section 130, an image processing section 140 and an image forming section 150. In this connection, the image-bearing paper sheet, onto which an image is formed in the image forming apparatus 100, is conveyed outside towards the first paper sheet processing apparatus 300.

In the structural configuration above-mentioned, the control section 101 controls each of the sections provided in the image forming apparatus 100, and at the same time, controls overall operations of the system serving as the image forming system. The communication section 102 implements operations for communicating with other apparatuses coupled thereto. The operation display section 103 notifies the control section 101 of the operation inputting signals generated corresponding to the inputting operations performed thereon by the user, and at the same time, displays the current statuses of the image forming apparatus 100. The storage section 104 stores various kinds of controlling programs and various kinds of setting data, and is used as the working area for executing the controlling programs.

The paper sheet feeding section 105 feeds the paper sheets, accommodated therein, towards the image forming section 150. The conveyance section 107 conveys the paper sheet, fed from the paper sheet feeding section 105 and to be employed for an image forming operation, at a predetermined velocity. The document reading section 120 scans the document so as to generate image data thereof. The image data storage section 130 stores the image data, which is to be employed for the image forming operation, and various kinds of data. The image processing section 140 applies various kinds of image processing, necessary for forming the image, to the image data generated by the document reading section 120. The image forming section 150 implements an image forming operation (hereinafter, also referred to as a "printing operation") based on the image forming command and the processed image data created by applying the image processing to the image data.

The first paper-sheet processing apparatus 300 is coupled to the image forming apparatus 100 as the successive stage thereof, and constituted by a control section 301, a communication section 302, a storage section 304, an ejection path selecting section 305, a conveyance section 307, a crease attaching section 310, the truing (matching) section 320, a fold processing section 330, an overlapping section 340, a saddle stitching section 350, a rectangular spine processing section 360 and a cut processing section 370.

In the configuration above-mentioned, the control section 301 controls each of the sections provided in the first paper-sheet processing apparatus 300. The communication section 302 communicates with the image forming apparatus 100. The storage section 304 stores various kinds of controlling programs and various kinds of setting data, and is used as the working area for executing the controlling programs. The ejection path selecting section 305 selects one of ejection paths, through which a bunch of paper sheets is to be ejected after a paper sheet processing has applied thereto. The conveyance section 307 conveys a paper sheet at a predetermined conveyance velocity. The crease attaching section 310 attaches a crease onto a paper sheet without folding the paper sheet as a whole.

The truing section 320 serves as a position controlling section that performs a position controlling operation for truing the crease attached paper sheet in preparation for a next paper sheet processing. The fold processing section 330 applies the center fold processing to the paper sheet or folds the paper sheet three. The overlapping section 340 overlaps paper sheets with each other so as to form a bunch of paper sheets in preparation for applying a paper sheet processing. The saddle stitching section 350 applies a saddle stitch processing, serving as one of paper sheet processing, to the bunch of paper sheets folded by the fold processing section 330. The rectangular spine processing section 360 applies a rectangular spine processing for making the spine folded portion of the bunch of paper sheets, onto which the fold line for saddle stitching use has been formed, flat, thereto. The cut processing section 370 cuts the edge portion of the bunch of paper sheets saddle-stitched.

The second paper-sheet processing apparatus 400 is coupled to the first paper-sheet processing apparatus 300 as the successive stage thereof, and constituted by a control section 401, a communication section 402, a storage section 404, an ejection path selecting section 405, a conveyance section 410, a side stitching section 420, a main-tray ejection section 440 and a sub-tray ejection section 450.

In the configuration above-mentioned, the control section 401 controls each of the sections provided in the second paper-sheet processing apparatus 400. The communication section 402 communicates with the image forming apparatus 100 and the first paper-sheet processing apparatus 300. The storage section 404 stores various kinds of controlling programs and various kinds of setting data, and is used as the working area for executing the controlling programs.

The ejection path selecting section 405 selects one of ejection paths, through which a bunch of paper sheets is to be ejected after a paper sheet processing has applied thereto. The conveyance section 410 conveys a paper sheet at a predetermined conveyance velocity. The side stitching section 420 applies a side stitch processing to the bunch of paper sheets. The main-tray ejection section 440 ejects a paper sheet onto a main tray serving as a conveyance destination tray thereof. The sub-tray ejection section 450 ejects a paper sheet onto a sub tray serving as a conveyance destination tray thereof.

Figure 2:
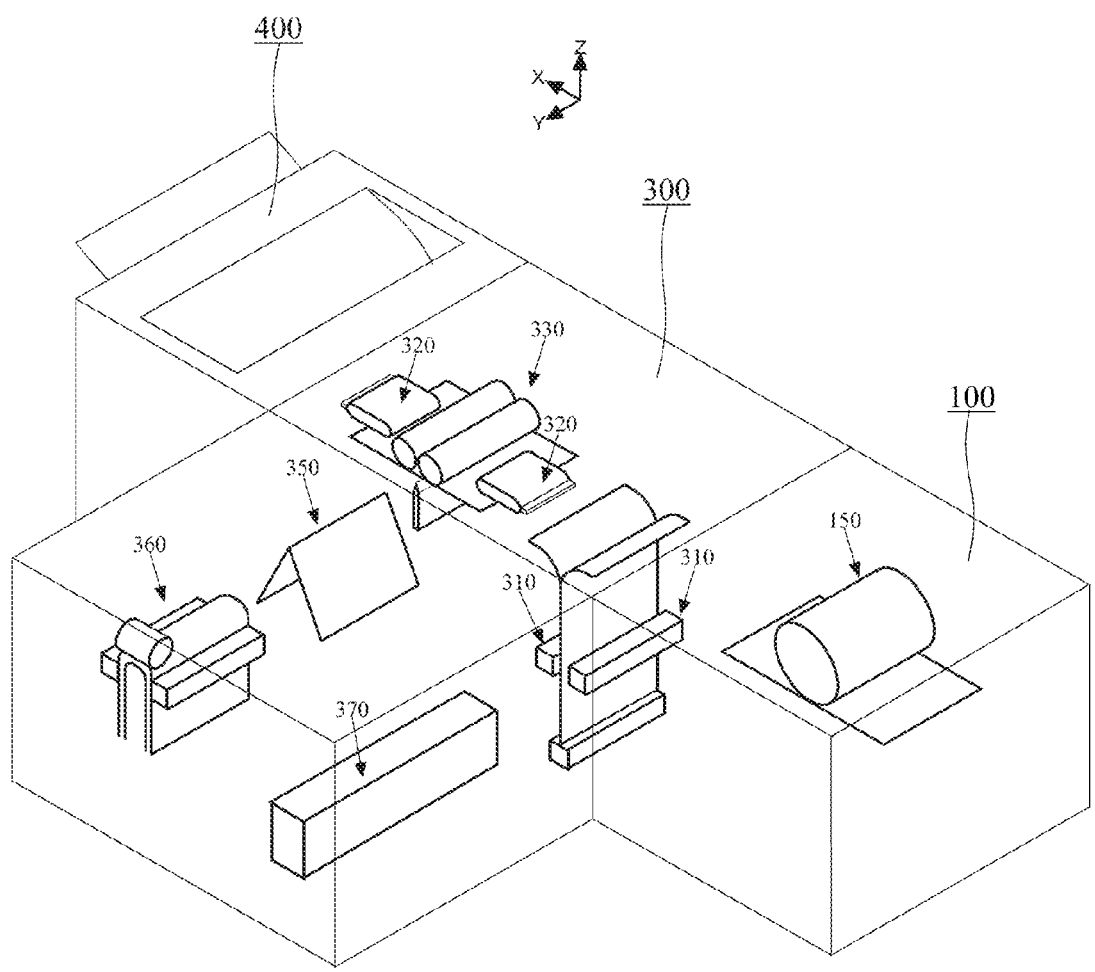
FIG. 2 is a schematic diagram showing an exploded transparent perspective view of a configuration of an image forming system in accordance with an embodiment of the present invention.

In this connection, the perspective view shown in FIG. 2 schematically indicates the main sections included in the image forming system as an exploded transparent perspective view. In a case where the image forming section 150 provided in the image forming apparatus 100 forms an image onto a paper sheet, and then, the second paper-sheet processing apparatus 400 applies a paper sheet processing to the image-bearing paper sheet, conveyed in direction X shown in FIG. 2, the first paper-sheet processing apparatus 300 also conveys the image-bearing paper sheet in direction X as it is.

On the other hand, in a case where the first paper-sheet processing apparatus 300 further applies another paper sheet processing to the image-bearing paper sheet, as shown in FIG. 2, the crease attaching section 310 attaches a crease in direction Y, and then, the fold processing section 330 applies a center fold processing to the image-bearing paper sheet while setting a ridge line at direction Y. Successively, the overlapping section 340 and the saddle stitching section 350 conveys the center-folded paper sheet in direction Y to overlap it with the other center-folded paper sheet, and then, applies the fold and saddle stitch processing to the overlapped paper sheets. Still successively, the rectangular spine processing section 360 further conveys the saddle stitched paper sheets in direction Y so as to apply a rectangular spine processing for making the spine portion flat thereto. According to the above-mentioned process, the execution efficiency of the paper sheet processing can be heightened, and as a result, it becomes possible to highly improve the productivity of the image forming system concerned.

Further, each of the connection mode, the system configuration and the arrangement of the image forming system, including the image forming apparatus 100, the first paper-sheet processing apparatus 300 and the second paper-sheet processing apparatus 400, exemplified in the block diagram and the schematic diagram shown in FIG. 1 and FIG. 2 respectively, is merely a concrete example preferred from various kinds of modified image forming systems. Therefore, the scope of the present invention is not limited to the connection mode, the system configuration, the paper sheet conveying direction, etc., shown in FIG. 1 and FIG. 2.

Basic Operations

Figure 3:
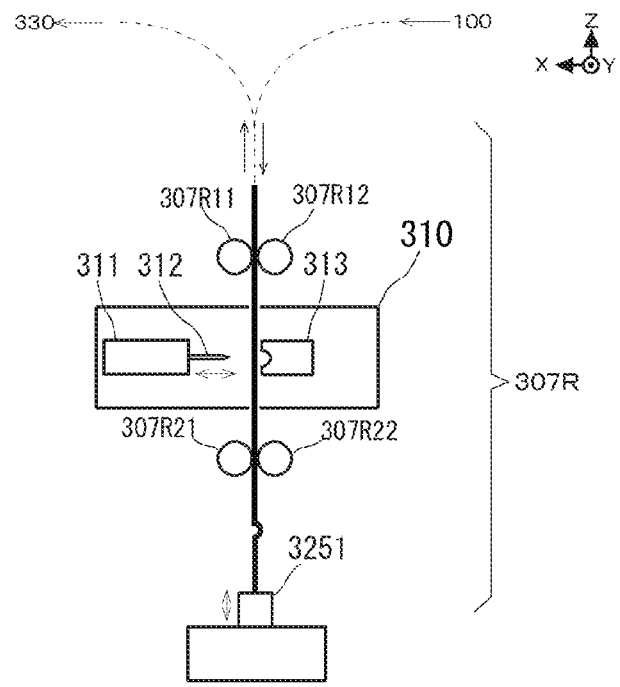
FIG. 3 is a schematic diagram showing a structural configuration of a main section of an image forming system in accordance with an embodiment of the present invention.
Figure 4:
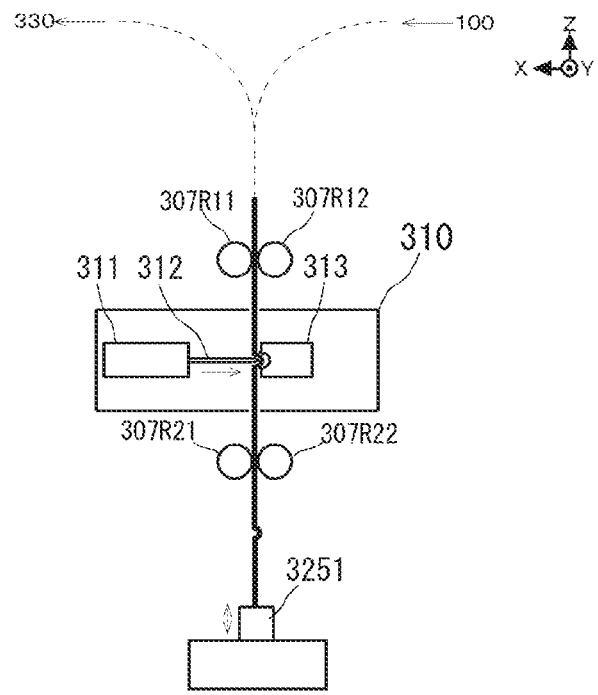
FIG. 4 is a schematic diagram showing another structural configuration of a main section of an image forming system in accordance with an embodiment of the present invention.

Next, as an example of paper sheet processing, the structural configuration and the operations of the crease attaching section 310 will be detailed in the following. FIG. 3 and FIG. 4 are schematic diagrams showing cross sectional views of a fundamental structure of the crease attaching section 310, called a creaser, for implementing the crease processing.

Herein, in a case where the crease attaching section 310 applies the crease processing to the paper sheet conveyed from the image forming apparatus 100 to the crease attaching section 310, the paper sheet is led into a reverse conveyance path 307R. Further, the paper sheet concerned is made to stop at the predetermined position (indicated in the schematic diagram shown in FIG. 3) by tightly-clipped conveyance controlling actions performed by a pair of conveyance rollers 307R11, 307R12 and another pair of conveyance rollers 307R21, 307R22 and by a position regulating action performed by an leading edge stopper 3251.

In this connection, hereinafter, the position of the surface of the leading edge stopper 3251, to which a side edge of the paper sheet is made to contact, is defined as the "apparatus reference position", serving as a reference position at the apparatus side. Further, hereinafter, the position of the side edge of the paper sheet, which is made to contact the surface of the leading edge stopper 3251, is defined as the "paper sheet reference position", serving as a reference position at the paper sheet side.

Successively, referring to the apparatus reference position of the leading edge stopper 3251, the crease attaching section 310 applies the paper sheet processing to the paper-sheet processing implementation position of the paper sheet, being apart from the apparatus reference position of the leading edge stopper 3251 by the predetermined distance designated.

After that, a creasing knife 312, a leading edge portion of which is extended in direction Y, is driven to protrude in reverse direction −X towards a crease forming plate 313 that has a groove extended in direction Y, by a creasing knife driving section 311. As a result, the paper sheet is tightly clipped between the leading edge portion of the creasing knife 312 and the groove of the crease forming plate 313, so as to form a crease, a longitudinal direction of which is in direction Y onto the paper sheet (as indicated in the schematic diagram shown in FIG. 4). In this connection, in the crease processing above-mentioned, the paper sheet still keeps a state of its flat shape as a whole, and accordingly, unlike the fold line to be formed in the fold processing, the crease, having a semicircular-shaped cross section, is simply formed on the flat surface of the paper sheet concerned.

Further, according to the crease processing above-mentioned, it is possible to form either a single crease or a plurality of creases at a desired position or at desired positions on the paper sheet by adaptively controlling the tightly-clipped conveyance operation performed by the pair of conveyance rollers 307R11, 307R12 and the pair of conveyance rollers 307R21, 307R22, and adaptively controlling the stoppage position of the leading edge stopper 3251. Still further, the concerned paper sheet, onto which the single crease or a plurality of creases is/are formed, is conveyed in the reverse direction through the reverse conveyance path 307R, and further conveyed towards the fold processing section 330.

In this connection, in order to achieve the "predetermined distance" for positioning the paper-sheet processing implementation position, the three kinds of controlling operations, described as follow, are applicable. The crease attaching section 310 is fixed, while the leading edge stopper 3251 is made to protrude and pull back in a paper sheet conveyance direction. The leading edge stopper 3251 is fixed, while the crease attaching section 310 moves in a paper sheet conveyance direction. Both the leading edge stopper 3251 and the crease attaching section 310 move in a paper sheet conveyance direction. Incidentally, any one of the three kinds of operations, above-mentioned, may be applicable for this purpose.

Further, as well as the above-mentioned, even with respect to another paper sheet processing, a concrete example of which is not indicated hereinafter, by coinciding the apparatus reference position and the paper sheet reference position with each other, it becomes possible to implement the concerned paper sheet processing at the paper-sheet processing implementation position being apart from the apparatus reference position by a predetermined distance.

Still further, although the concrete example, in which the apparatus reference position and the paper sheet reference position are made to coincide with each other at the leading edge side in the paper sheet conveyance direction, has been described while referring to the schematic diagrams shown in FIG. 2 through FIG. 4, the scope of the present invention is not limited to the concrete example aforementioned. Namely, it is also applicable that the system is so constituted that the apparatus reference position and the paper sheet reference position are made to coincide with each other at the side surface in the paper sheet conveyance direction, Operations of Embodiment Next, referring to the flowchart shown in FIG. 5 and the various kinds of explanatory schematic diagrams shown in FIG. 6 through FIG. 21, the operations to be conducted in the preferred embodiment of the present invention will be detailed in the following.

In this connection, the following explanatory descriptions for explaining the operating steps of the flowchart also serve as the explanatory descriptions for explaining the operations to be conducted in the image forming system, the explanatory descriptions for explaining the image-forming system controlling procedures for controlling the operations to be conducted in the image forming system concerned as a whole, and the explanatory descriptions for explaining various kinds of controlling programs to be executed by the computers, included in the image forming system, for controlling the same.

Figure 5:
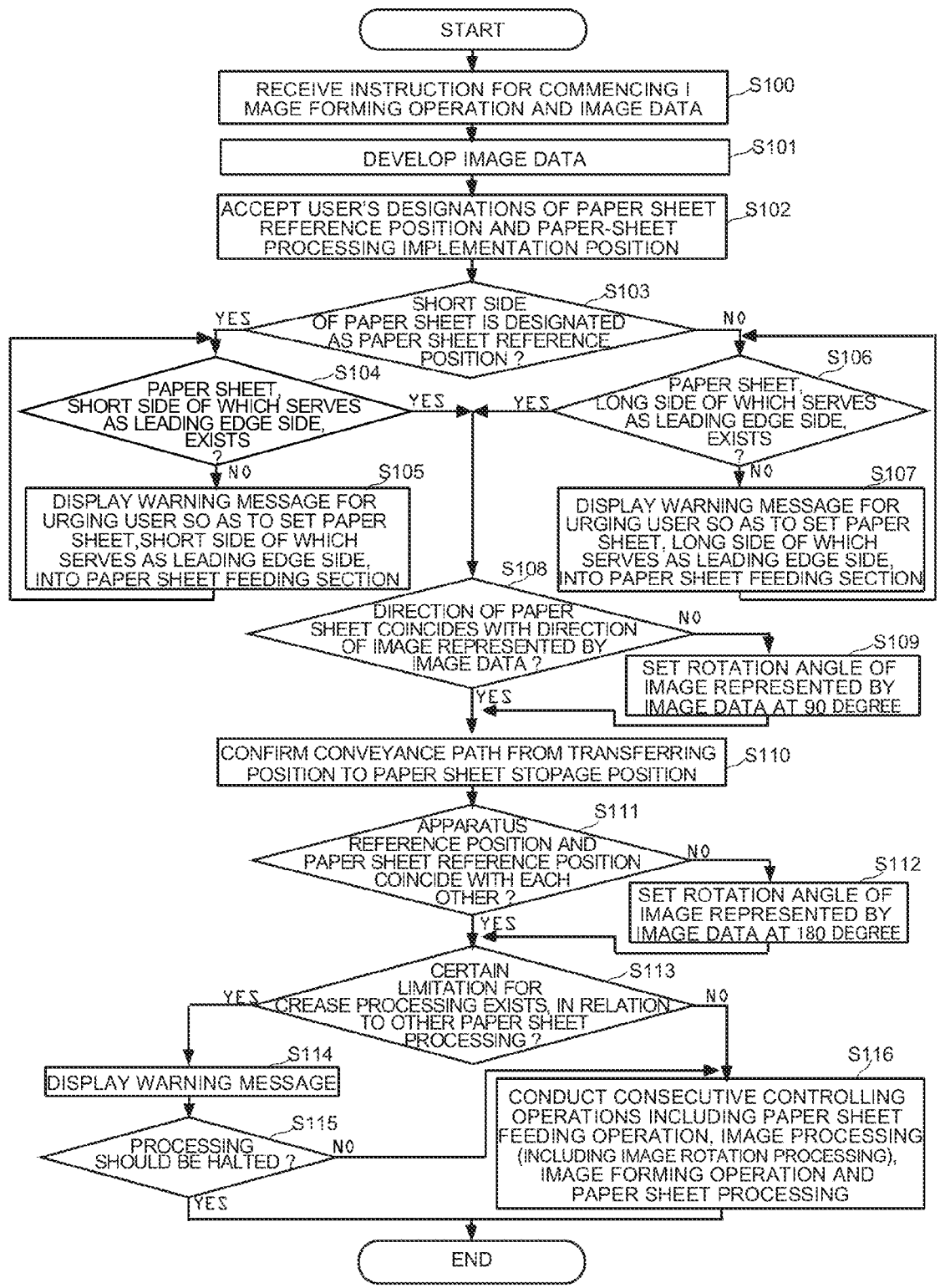
FIG. 5 is a flowchart indicating a flow of operations to be performed in an image forming system in accordance with an embodiment of the present invention.

Initially, the control section 101 receives an instruction for commencing an image forming operation and image data, through an operating display section 103 or an external personal computer (Step S100, shown in FIG. 5). In this connection, other than the image data received from the external environment, the control section 101 may receive specific image data designated from various kinds of image data stored in advance in the storage section 104 or the image data storage section 130.

In this connection, the above-mentioned instruction for commencing the image forming operation includes various kinds of designations (job setting information), including a designation of kind of paper sheet to be used, a number of copies to be image-formed, designations of various kinds of paper sheet processing to be applied, etc.

Incidentally, hereinafter in the present embodiment, it is assumed that at least a designation of the crease processing is included in the instruction for commencing the image forming operation, and in the following explanations, the crease processing is also referred to as the first paper sheet processing, while any one of paper sheet processing, other than the crease processing, is also referred to as the second paper sheet processing.

Successively, when determining that the received image data, having an image forming designation, is written in a kind of compression format or the Page Description Language, the control section 101 develops the concerned image data into developed image data (for instance, bitmap image data), being actually available for the image forming operation on the storage section 104 and/or the image data storage section 130 (Step S101, shown in FIG. 5).

Still successively, as a preliminary preparation before designating the paper-sheet processing implementation position in regard to the crease processing currently designated, the control section 101 makes the operating display section 103 display a display screen 103G (shown in FIG. 6) from which the user can designate the paper sheet reference position serving as a reference position of the paper sheet side, which is to be contacted with the apparatus reference position. In addition, the control section 101 accepts the paper sheet reference position designated by the user through the display screen 103G of the operating display section 103 (former-half of Step S102, shown in FIG. 5)

In this connection, the paper sheet reference position, serving as the reference position of the paper sheet side, is defined as a side edge line of the paper sheet, which is designated in the paper sheet side, and contacts the apparatus reference position serving as a start point of the paper-sheet processing implementation position.

Figure 6:
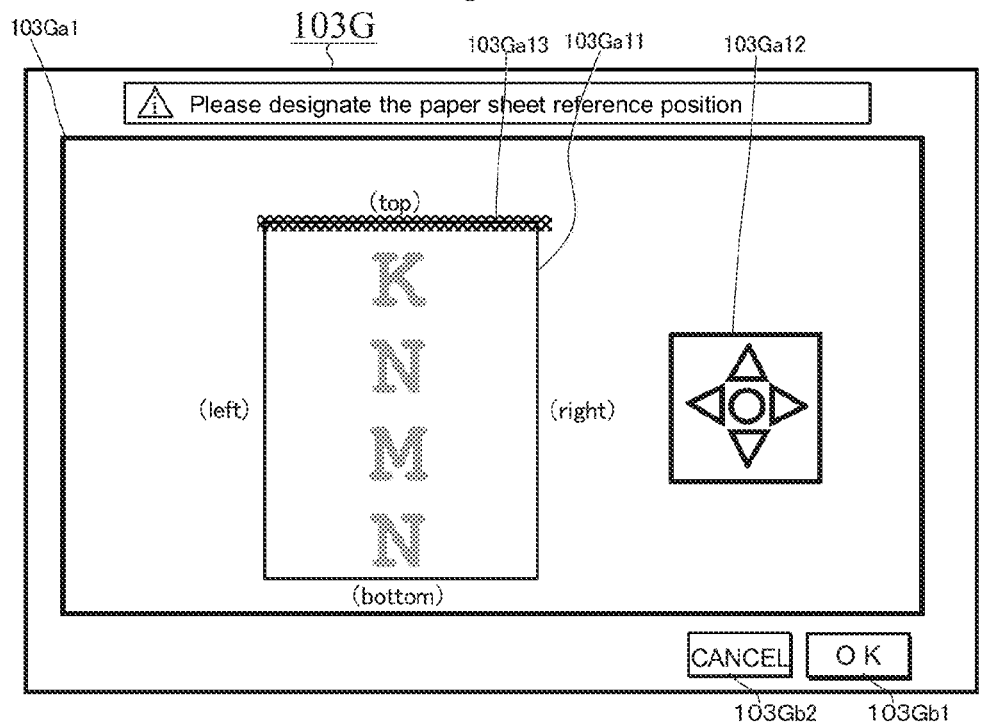
FIG. 6 is an exemplary schematic diagram showing an exemplified screen to be displayed during an operation of image forming system in accordance with an embodiment of the present invention.

Further, the paper sheet reference position, above-mentioned, represents not only the discrimination between the short side and the long side of the paper sheet, but also, such a meaning of the upper side of the image as well as the short side of the paper sheet in relation to the arrangement of the image to be formed on the paper sheet concerned (as shown in FIG. 6).

In the exemplified schematic diagram shown in FIG. 6, a paper-sheet reference position designating screen 103Ga1 is displayed within the display screen 103G. Further, within the area of a paper-sheet reference position designating screen 103Ga1, an on-paper-sheet image sample 103Ga11 in which a direction of the paper sheet concerned and an example of the image arrangement are indicated, and a designation operating section 103Ga12 provided with a direction designating section that is available for designating any one of the upper, lower, left and right directions, thereby.

Still successively, by using the direction designating section included in the designation operating section 103Ga12, the user designates any one of the side edge lines of the paper sheet as the paper sheet reference position, on the on-paper-sheet image sample 103Ga11. In the schematic diagram shown in FIG. 6, a paper-sheet reference position designation indicator 103Ga13 is displayed over the short side line of the paper sheet that corresponds to the upper side of the image, so as to indicate such a state that the short side of the paper sheet, which corresponds to the upper side of the image, is designated as the paper sheet reference position Still successively, at the time when the designation of the paper sheet reference position has been completed through the above-mentioned process, the control section 101 makes the operating display section 103 display the display screen 103G for accepting the designation of the paper-sheet processing implementation position to be employed for the crease processing currently designated, as indicated in the schematic diagram shown in FIG. 7. Then, the control section 101 accepts the paper-sheet processing implementation position designated by the user through the operating display section 103 (latter-half of Step S102, shown in FIG. 5).

Figure 7:
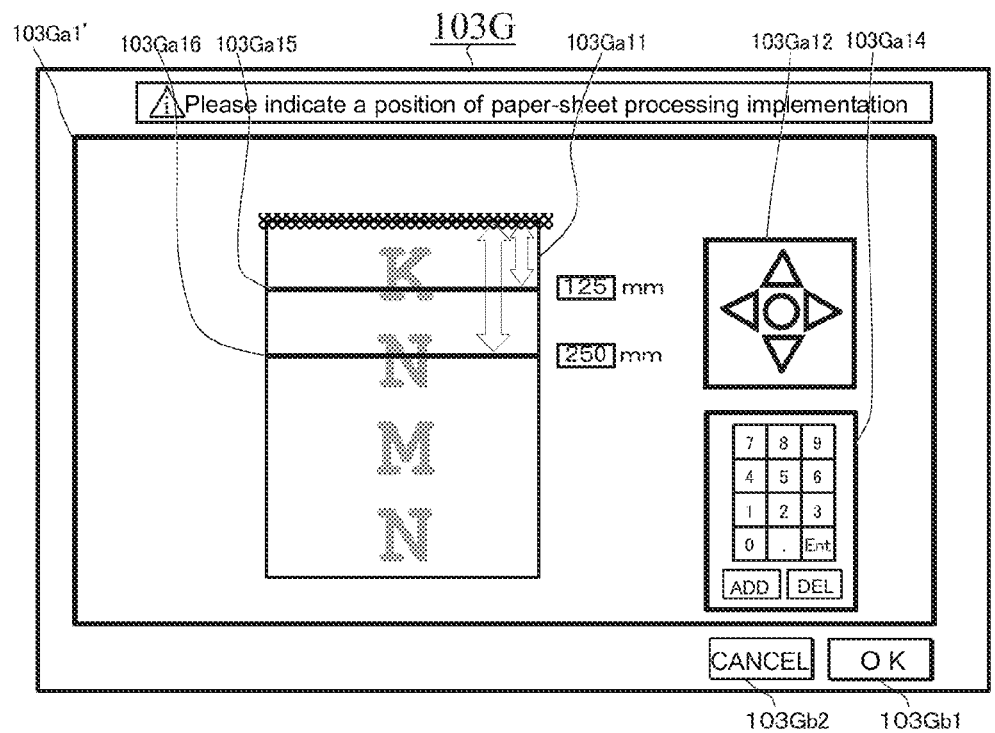
FIG. 7 is an exemplary schematic diagram showing another exemplified screen to be displayed during an operation of image forming system in accordance with an embodiment of the present invention.

In the exemplified schematic diagram shown in FIG. 7, a paper-sheet processing-implementation position designation screen 103Ga11 is indicated within the display screen 103G. Further, within an area of the paper-sheet processing-implementation position designation screen 103Ga11, the on-paper-sheet image sample 103Ga11 in which a direction of the paper sheet concerned and an example of the image arrangement are indicated, the designation operating section 103Ga12 which makes it possible to move the paper-sheet processing implementation position by using the arrow keys, and a numeral value designating section 103Ga14 from which the paper-sheet processing implementation position can be designated by using the numeric keypad, are indicated. According to the exemplified schematic diagram shown in FIG. 7, indicated is such a state that the paper-sheet processing implementation position is designated at the position, being apart from the paper sheet reference position by 125 mm, and the other position, being apart from the paper sheet reference position by 250 mm. In this connection, each of the distances of 125 mm and 250 mm is equivalent to the predetermined distance from the apparatus reference position to the paper-sheet processing implementation position.

The image forming system indicated in the schematic diagrams shown in FIG. 2 through FIG. 4, is so constituted that the apparatus reference position and the paper sheet reference position are made to coincide with each other at the leading edge side of the paper sheet currently conveyed in the paper sheet conveyance direction. Accordingly, in a case where the user designates the short side of the paper sheet concerned as the paper sheet reference position (Step S103; YES, shown in FIG. 5), the control section 101 determines whether or not such the paper sheet having the concerned size, and the short side of which serves as the leading edge side in the conveyance direction, exists in the paper sheet feeding section 105 (Step S104, shown in FIG. 5).

Successively, when determining that the paper sheet having the concerned size, and the short side of which serves as the leading edge side in the conveyance direction, exists in the paper sheet feeding section 105 (Step S104; YES, shown in FIG. 5), the control section 101 proceed the processing to the next step. On the other hand, when determining that the paper sheet having the concerned size, and the short side of which serves as the leading edge side in the conveyance direction, does not exist in the paper sheet feeding section 105 (Step S104; NO, shown in FIG. 5), the control section 101 recognizes that none of the concerned paper sheet remains in the paper sheet feeding section 105. For this reason, the control section 101 makes the operating display section 103 display a warning display screen to urge the user so as to set the concerned paper sheet (the short side of which serves as the leading edge side in the conveyance direction) into the paper sheet feeding section 105 (Step S105, shown in FIG. 5).

In this connection, in such a case where operating instructions are received from an external personal computer and determining that the concerned paper sheet does not exist in the paper sheet feeding section 105, the control section 101 notifies the external personal computer of the warning display screen to urge the user so as to set the concerned paper sheet (the short side of which serves as the leading edge side in the conveyance direction) into the paper sheet feeding section 105.

The image forming system indicated in the schematic diagrams shown in FIG. 2 through FIG. 4, is so constituted that the apparatus reference position and the paper sheet reference position are made to coincide with each other at the leading edge side of the paper sheet currently conveyed in the paper sheet conveyance direction.

Accordingly, in a case where the user designates the long side of the paper sheet concerned as the paper sheet reference position (Step S103; NO, shown in FIG. 5), the control section 101 determines whether or not such the paper sheet having the concerned size, and the long side of which serves as the leading edge side in the conveyance direction, exists in the paper sheet feeding section 105 (Step S106, shown in FIG. 5).

Successively, when determining that the paper sheet having the concerned size, and the long side of which serves as the leading edge side in the conveyance direction, exists in the paper sheet feeding section 105 (Step S106; YES, shown in FIG. 5), the control section 101 proceed the processing to the next step.

On the other hand, when determining that the paper sheet having the concerned size, and the long side of which serves as the leading edge side in the conveyance direction, does not exist in the paper sheet feeding section 105 (Step S106; NO, shown in FIG. 5), the control section 101 recognizes that none of the concerned paper sheet remains in the paper sheet feeding section 105. For this reason, the control section 101 makes the operating display section 103 display a warning display screen to urge the user so as to set the concerned paper sheet (the long side of which serves as the leading edge side in the conveyance direction) into the paper sheet feeding section 105 (Step S107, shown in FIG. 5).

In this connection, in such a case where operating instructions are received from an external personal computer and determining that the concerned paper sheet does not exist in the paper sheet feeding section 105, the control section 101 notifies the external personal computer of the warning display screen to urge the user so as to set the concerned paper sheet (the long side of which serves as the leading edge side in the conveyance direction) into the paper sheet feeding section 105.

Still successively, the control section 101 determines whether or not the direction of the paper sheet, determined on the basis of the paper sheet reference position, coincides with the direction of the image represented by the image data (namely, arrangement of the image on the paper sheet) (Step S108, shown in FIG. 5).

When determining that the direction of the paper sheet, determined on the basis of the paper sheet reference position, does not coincide with the direction of the image represented by the image data (Step S108; NO, shown in FIG. 5), the control section 101 modifies and establishes the image data so as to make the image represented by the image data rotate at angle 90°, in order to realize the states shown in FIG. 6 and FIG. 7 (Step S109, shown in FIG. 5).

Further, the control section 101 confirms the conveyance operation and the reversing operation of the paper sheet, conducted in the path from the transferring position at which the toner image is transferred onto the paper sheet in the image forming section 150 to the paper sheet stoppage position of the crease processing (position of the leading edge stopper 3251) (Step S110, shown in FIG. 5), and confirms whether or not the apparatus reference position and the paper sheet reference position coincide with each other (Step S111, shown in FIG. 5). For instance, sometimes, the paper sheet may be reversed in midcourse of the conveying operation thereof, in relation to the designation of the face-up mode or face-down mode at the time of ejecting the paper sheet concerned, and, due to the reversing operation above-mentioned, sometimes, the direction of the paper sheet reference position has been changed at angle 180°.

Still successively, when determining that the apparatus reference position and the paper sheet reference position does not coincide with each other (Step S111; NO, shown in FIG. 5), the control section 101 modifies and establishes the image data so as to make the image represented by the image data rotate at angle 180°, in order to realize the states shown in FIG. 6 and FIG. 7 at the position of the leading edge stopper 3251 of the crease attaching section 310 (Step S112, shown in FIG. 5).

Still successively, the control section 101 determines whether or not a certain limitation for the crease processing (first paper sheet processing) emerges, in relation to the other paper sheet processing (second paper sheet processing) designated for the image forming operation concerned (Step S113, shown in FIG. 5). For instance, the limitation examples for the crease processing are cited as follows.

Limitation Example 1

Such a case that, owing to the necessity for changing the direction of the paper sheet in the crease processing in relation to the implementation of the other paper sheet processing, it is impossible to make the apparatus reference position and the paper sheet reference position coincide with each other in the crease processing.

Limitation Example 2

Such a case that, due to a lack of paper sheet that fulfills all of the conditional requirements, including requirements for implementing the other paper sheet processing (such as the direction of the paper sheet, etc.) and requirements for implementing the crease processing (such as the direction of the paper sheet, etc.), it is impossible to implement all of the paper sheet processing.

In this connection, each of the limitation examples cited in the above is merely one of various kinds of concrete examples, and accordingly, the scope of the limitation is not limited to those above-cited.

Figure 8:
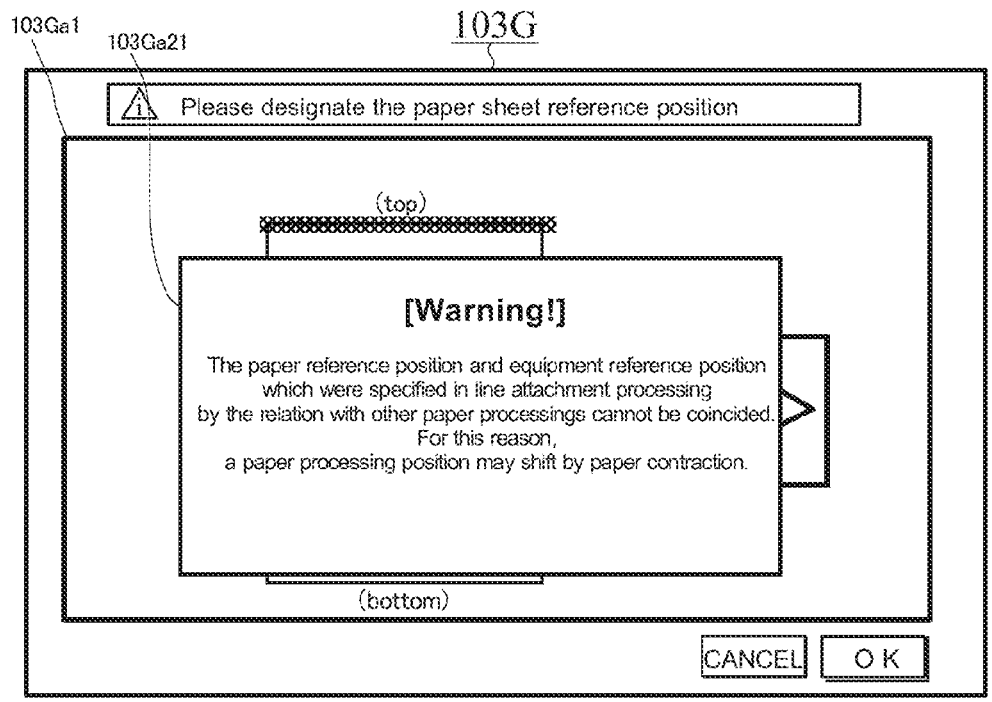
FIG. 8 is an exemplary schematic diagram showing still another exemplified screen to be displayed during an operation of image forming system in accordance with an embodiment of the present invention.

Still successively, in a case where, in relation to the other paper sheet processing designated for the image forming operation concerned, such the limitation that makes it impossible to make the apparatus reference position and the paper sheet reference position coincide with each other emerges (Step S113; YES, shown in FIG. 5), the control section 101 makes the operating display section 103 display the warning display screen 103Ga21 (as shown in FIG. 8) thereon (Step S114, shown in FIG. 5).

In this case, it is desirable that the warning display screen 103Ga21 includes a message, for instance, indicated as follow or the like:

"In relation to the other paper sheet processing, it is impossible to make the apparatus reference position and the paper sheet reference position coincide with each other. Owing to the above, sometimes, the paper sheet processing position may shift from the designated position due to the size contraction of the paper sheet."

Figure 9:
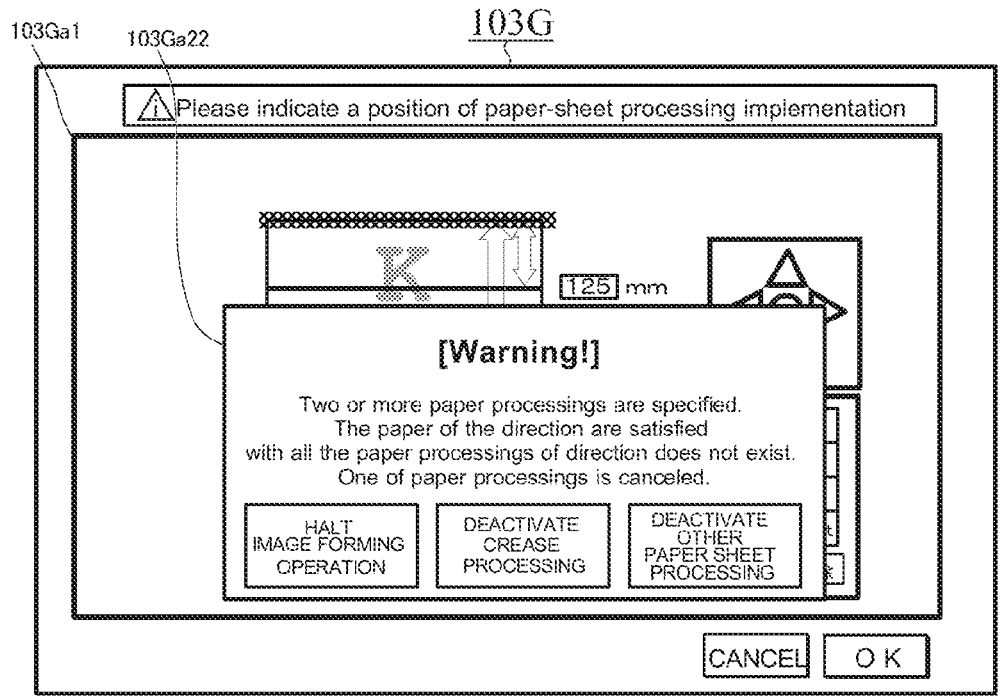
FIG. 9 is an exemplary schematic diagram showing still another exemplified screen to be displayed during an operation of image forming system in accordance with an embodiment of the present invention.

Still successively, in a case where, in relation to the other paper sheet processing designated for the image forming operation concerned, there emerges such the limitation that a paper sheet, which fulfills all of the conditional requirements, does not exist (Step S113; YES, shown in FIG. 5), the control section 101 makes the operating display section 103 display the warning display screen 103Ga22 (as shown in FIG. 9) thereon (Step S114, shown in FIG. 5).

In this case, it is desirable that the warning display screen 103Ga22 includes a message, for instance, indicated as follow or the like:

"Since a plural kinds of paper sheet processing is currently designated, such a paper sheet that fulfills all of the conditional requirements for the plural kinds of paper sheet processing designated. Please depress any one of the following buttons, to deactivate any one of the plural kinds of paper sheet processing or to halt the image forming operation."

[HALT IMAGE FORMING OPERATION]
[DEACTIVATE CREASE PROCESSING]
[DEACTIVATE OTHER PAPER SHEET PROCESSING]

Further, the control section 101 accept the instruction for halting and/or deactivating the operation and/or the processing concerned, inputted by the user through the warning display screen 103Gw (shown in FIG. 9) (Step S114, shown in FIG. 5).

In this connection, in a case where, in any one of the paper sheet processing, it is possible to change the direction of the processing, and as a result of changing the direction, the paper sheet that fulfills all of the conditional requirements exists, the control section 101 conducts controlling operations to make the operation for changing the direction of the paper sheet processing override the operation for halting and/or deactivating the operation and/or the processing concerned, so as to avoid the deactivation of the processing or the halt of the image forming operation as far as possible.

Still successively, in a case where, in relation to the other paper sheet processing, it is impossible to make the apparatus reference position and the paper sheet reference position coincide with each other in the crease processing, the control section 101 proceeds with the processing in the state that the apparatus reference position and the paper sheet reference position does not coincide with each other in the crease processing (Step S115; NO (PARTIAL DEACTIVATION OF PROCESSING), shown in FIG. 5).

Further, in a case where, in relation to the other paper sheet processing, the paper sheet that fulfills all of the conditional requirements does not exist, depending on the contents of the instruction issued from the user, the control section 101 proceeds with the processing in the state that any one of the paper sheet processing is deactivated (Step S115; NO (PARTIAL DEACTIVATION OF PROCESSING), shown in FIG. 5), or halts the image forming operation itself (Step S115; YES (HALT OF PROCESSING), END, shown in FIG. 5).

Yet successively, the control section 101 conducts the consecutive controlling operations including: making the paper sheet feeding section 105 feed the paper sheet, having the direction calculated through the aforementioned process, therefrom; making the image processing section 140 rotate the image at an angle corresponding to the rotational angle calculated through the aforementioned process; making the image forming section 150 form the image onto the paper sheet fed from the paper sheet feeding section 105; making the crease attaching section 310 apply the crease processing to the image-bearing paper sheet; and making the other paper sheet processing section apply the other paper sheet processing to the image-bearing paper sheet concerned (Step S116, shown in FIG. 5).

In this connection, the rotation processing above-mentioned is to be implemented at an angle established as any one of 90°, 180°, 270° (=90°+180°). Further, with respect to the processing partially deactivated in relation to the other paper sheet processing, the control section 101 proceed with each of the above-mentioned processing in the deactivated state.

Concrete Examples in Regard to Crease Processing

Concrete Example (1)

Figure 10:
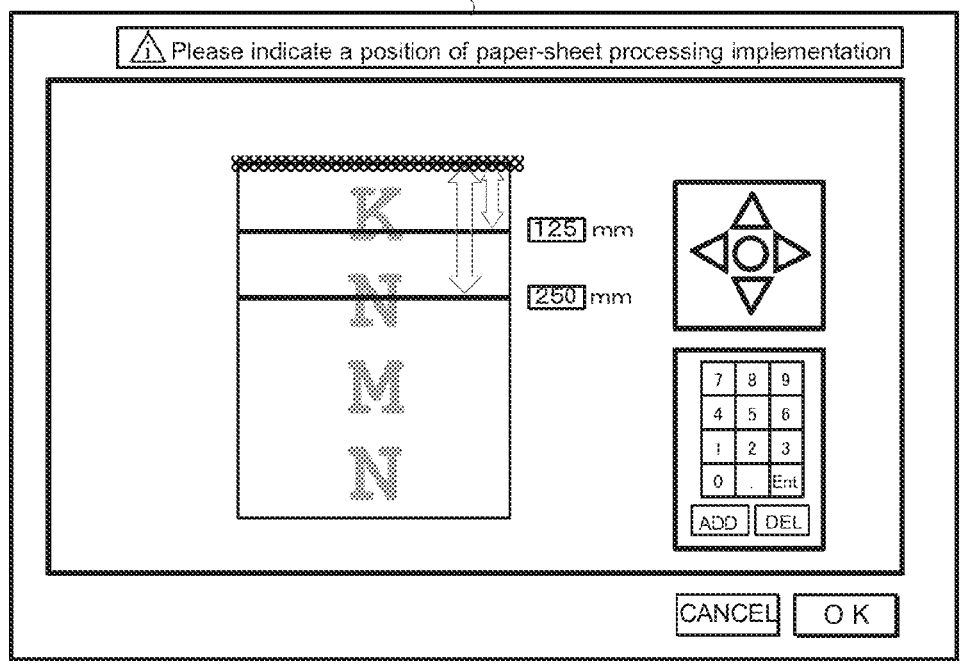
FIG. 10 is an exemplary schematic diagram showing still another exemplified screen to be displayed during an operation of image forming system in accordance with an embodiment of the present invention.
Figure 11:
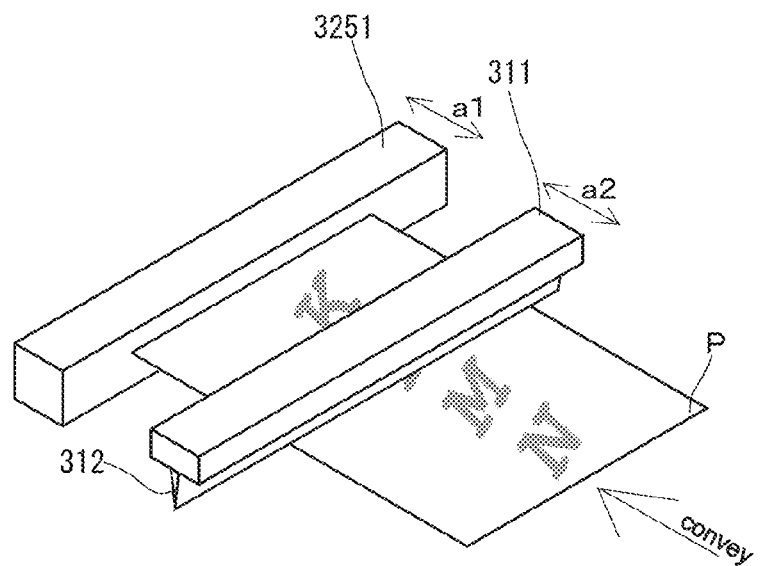
FIG. 11 is a schematic diagram showing a perspective view of an operating state of the image forming system in accordance with an embodiment of the present invention.

FIG. 10 is an exemplary schematic diagram indicating both the designation of the paper sheet reference position and the designation of the apparatus reference position, displayed on the display screen 103G. Further, FIG. 11 is a schematic diagram showing operations to be performed in the crease attaching section 310 in a case where the display screen 103G receives the designations shown in FIG. 10, inputted by the user. In this connection, for the convenience of reference, only the creasing knife driving section 311 is indicated as the crease attaching section 310 in FIG. 11.

In the schematic diagram shown in FIG. 10, the image is arranged in the vertically-longer sized paper sheet. Further, in the schematic diagram shown in FIG. 10, in relation to the image, the paper sheet reference position is established as the upper-short side of the paper sheet, and the paper-sheet processing implementation position is designated at a position shifting from the paper sheet reference position above-established. When receiving the designations indicated in the schematic diagram shown in FIG. 10, the control section 101 conveys the paper sheet in a state of setting the upper-short side of the paper sheet as the leading edge in the conveyance direction thereof, so as to make the paper sheet reference position and the apparatus reference position (a surface of the leading edge stopper 3251) coincide with each other.

On that occasion, the control section 101 conducts a controlling operation for moving the position of the leading edge stopper 3251, serving as the paper sheet reference position, in a directional, or moving the position of the creasing knife driving section 311 (crease attaching section 310) in a direction a2, so as to apply the paper sheet processing to the paper-sheet processing implementation position being apart from the paper sheet reference position by the predetermined distance designated from the paper-sheet reference position designating screen 103Ga1 indicated in the schematic diagram shown in FIG. 10 (shown in FIG. 11).

Concrete Example (2)

Figure 12:
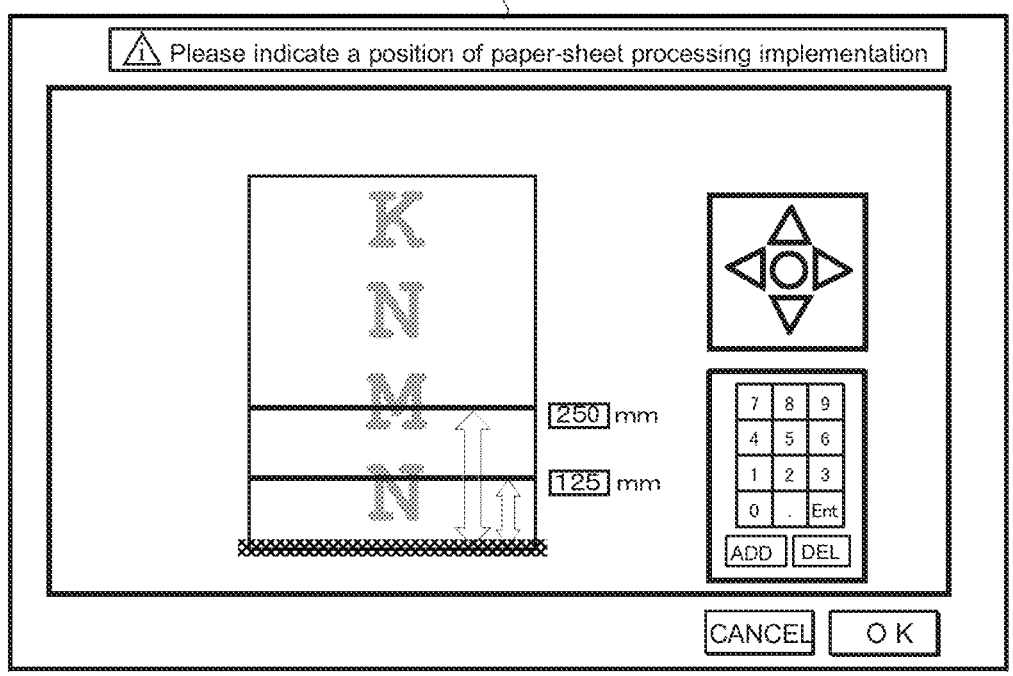
FIG. 12 is an exemplary schematic diagram showing still another exemplified screen to be displayed during an operation of image forming system in accordance with an embodiment of the present invention.

FIG. 12 is another exemplary schematic diagram indicating both the designation of the paper sheet reference position and the designation of the apparatus reference position, displayed on the display screen 103G. Further, FIG. 13 is another schematic diagram showing operations to be performed in the crease attaching section 310 in a case where the display screen 103G receives the designations shown in FIG. 12, inputted by the user.

In the schematic diagram shown in FIG. 12, the image is arranged in the vertically-longer sized paper sheet. Further, in the schematic diagram shown in FIG. 12, in relation to the image, the paper sheet reference position is established as the lower-short side of the paper sheet, and the paper-sheet processing implementation position is designated at a position shifting from the paper sheet reference position above-established. When receiving the designations indicated in the schematic diagram shown in FIG. 12, the control section 101 conveys the paper sheet in a state of setting the lower-short side of the paper sheet as the leading edge in the conveyance direction thereof, so as to make the paper sheet reference position and the apparatus reference position (the surface of the leading edge stopper 3251) coincide with each other.

Figure 13:
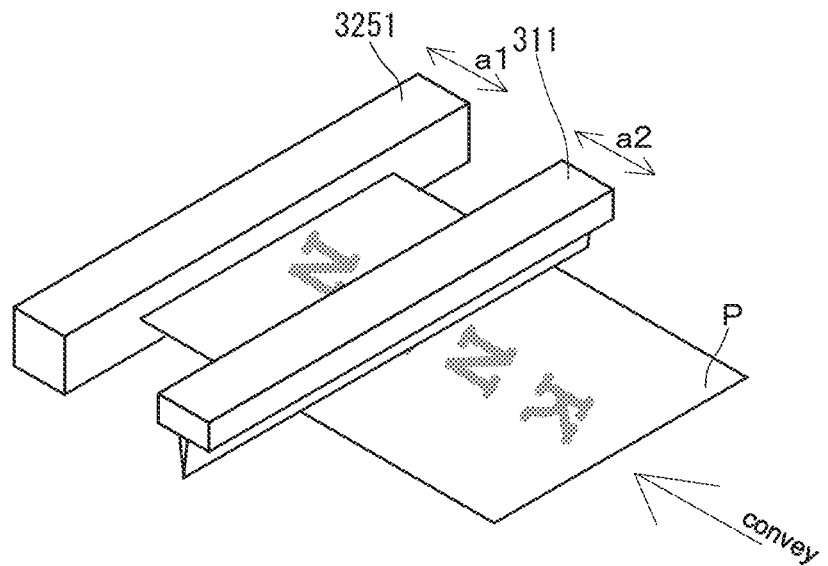
FIG. 13 is a schematic diagram showing a perspective view of another operating state of the image forming system in accordance with an embodiment of the present invention.

On that occasion, the control section 101 conducts a controlling operation for moving the position of the leading edge stopper 3251, serving as the paper sheet reference position, in the direction a1, or moving the position of the creasing knife driving section 311 (crease attaching section 310) in the direction a2, so as to implement the paper sheet processing at the paper-sheet processing implementation position being apart from the paper sheet reference position by the predetermined distance designated from the paper-sheet reference position designating screen 103Ga1 indicated in the schematic diagram shown in FIG. 12 (shown in FIG. 13).

Concrete Example (3)

Figure 14:
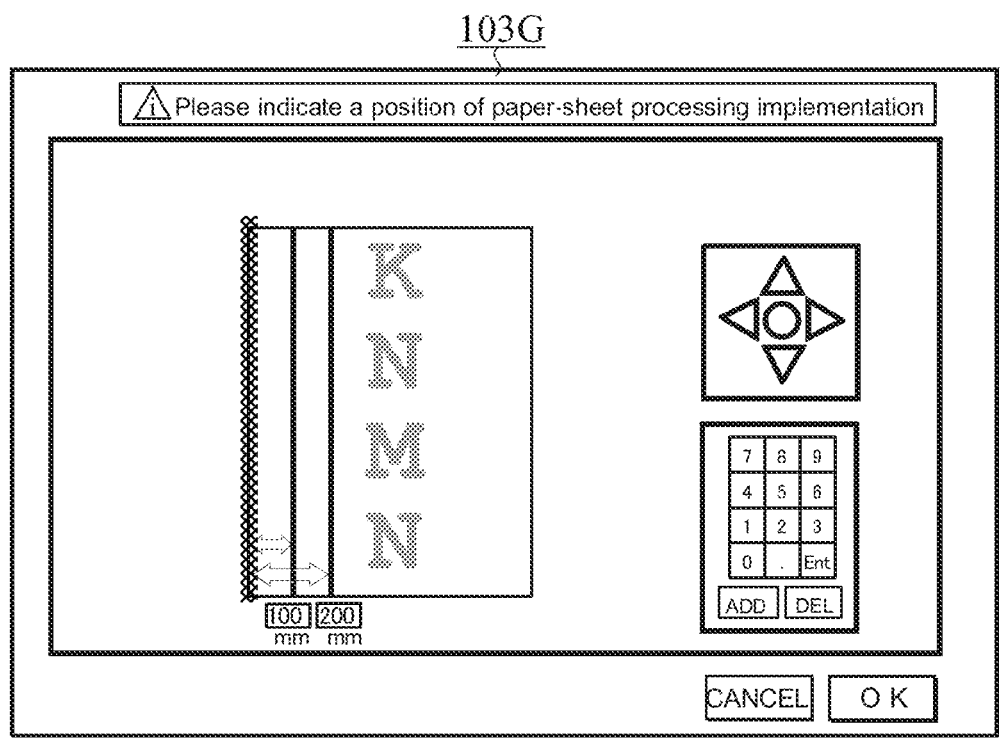
FIG. 14 is an exemplary schematic diagram showing still another exemplified screen to be displayed during an operation of image forming system in accordance with an embodiment of the present invention.

FIG. 14 is still another exemplary schematic diagram indicating both the designation of the paper sheet reference position and the designation of the apparatus reference position, displayed on the display screen 103G. Further, FIG. 15 is still another schematic diagram showing operations to be performed in the crease attaching section 310 in a case where the display screen 103G receives the designations shown in FIG. 14, inputted by the user.

In the schematic diagram shown in FIG. 14, the image is arranged in the vertically-longer sized paper sheet. Further, in the schematic diagram shown in FIG. 14, in relation to the image, the paper sheet reference position is established as the left-long side of the paper sheet, and the paper-sheet processing implementation position is designated at a position shifting from the paper sheet reference position above-established. When receiving the designations indicated in the schematic diagram shown in FIG. 14, the control section 101 conveys the paper sheet in a state of setting the left-long side of the paper sheet as the leading edge in the conveyance direction thereof, so as to make the paper sheet reference position and the apparatus reference position (the surface of the leading edge stopper 3251) coincide with each other.

Figure 15:
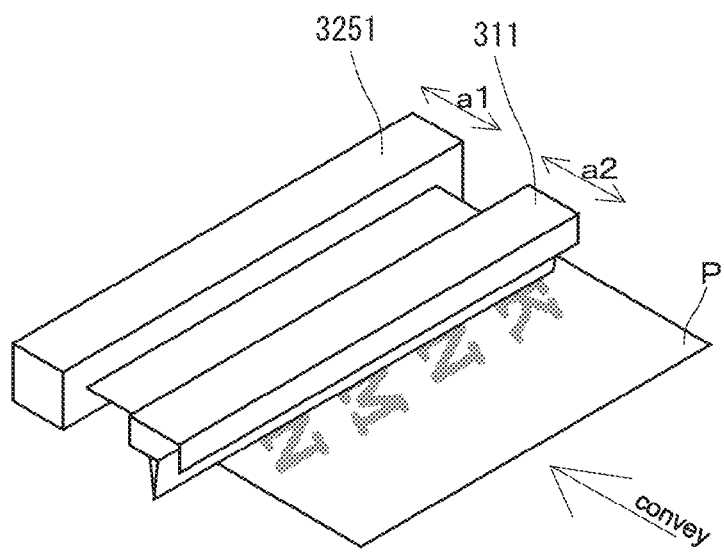
FIG. 15 is a schematic diagram showing a perspective view of still another operating state of the image forming system in accordance with an embodiment of the present invention.

On that occasion, the control section 101 conducts a controlling operation for moving the position of the leading edge stopper 3251, serving as the paper sheet reference position, in the direction a1, or moving the position of the creasing knife driving section 311 (crease attaching section 310) in the direction a2, so as to implement the paper sheet processing at the paper-sheet processing implementation position being apart from the paper sheet reference position by the predetermined distance designated from the paper-sheet reference position designating screen 103Ga1 indicated in the schematic diagram shown in FIG. 14 (shown in FIG. 15).

Concrete Example (4)

Figure 16:
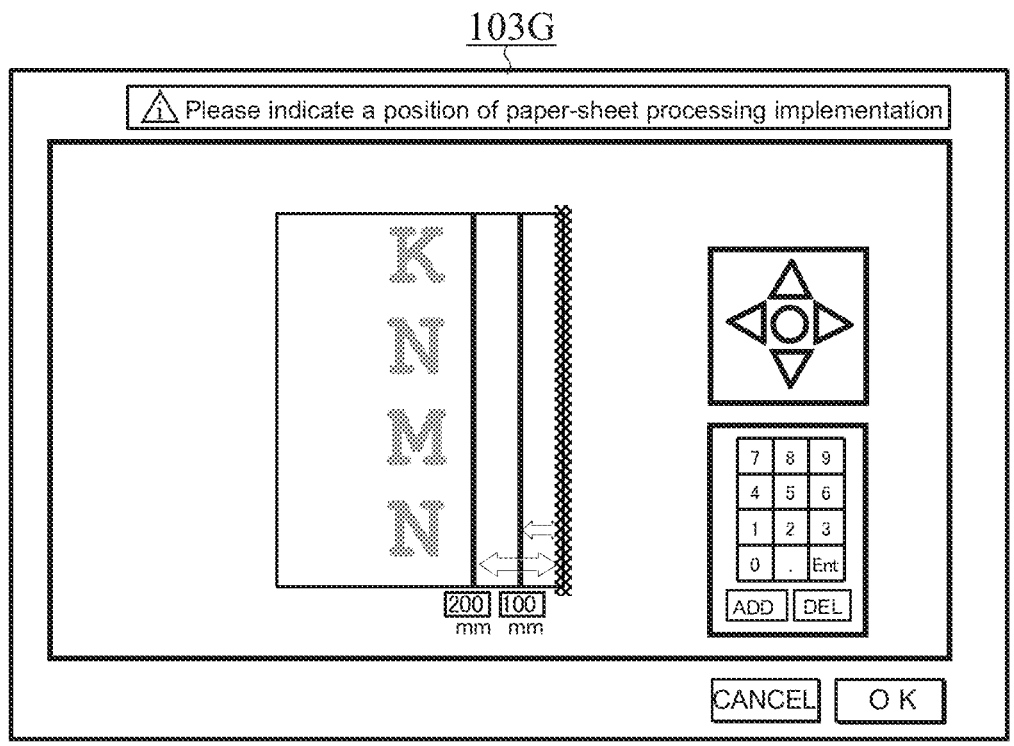
FIG. 16 is an exemplary schematic diagram showing still another exemplified screen to be displayed during an operation of image forming system in accordance with an embodiment of the present invention.
Figure 17:
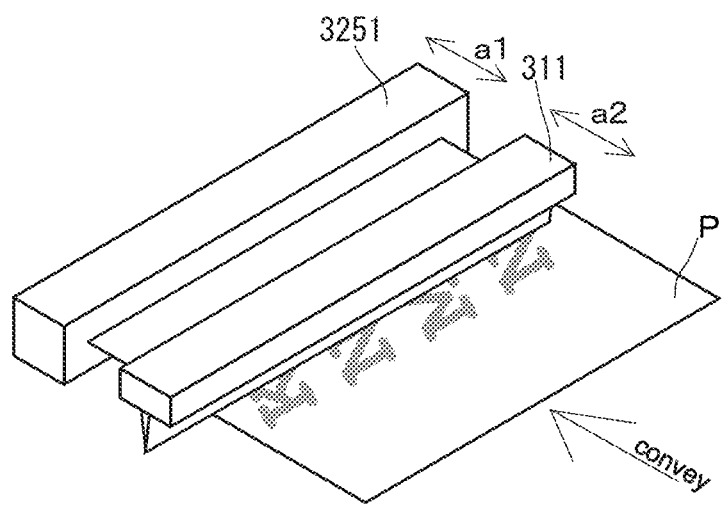
FIG. 17 is a schematic diagram showing a perspective view of still another operating state of the image forming system in accordance with an embodiment of the present invention.

FIG. 16 is still another exemplary schematic diagram indicating both the designation of the paper sheet reference position and the designation of the apparatus reference position, displayed on the display screen 103G. Further, FIG. 17 is still another schematic diagram showing operations to be performed in the crease attaching section 310 in a case where the display screen 103G receives the designations shown in FIG. 16, inputted by the user. In the schematic diagram shown in FIG. 16, the image is arranged in the vertically-longer sized paper sheet. Further, in the schematic diagram shown in FIG. 16, in relation to the image, the paper sheet reference position is established as the right-long side of the paper sheet, and the paper-sheet processing implementation position is designated at a position shifting from the paper sheet reference position above-established. When receiving the designations indicated in the schematic diagram shown in FIG. 16, the control section 101 conveys the paper sheet in a state of setting the right-long side of the paper sheet as the leading edge in the conveyance direction thereof, so as to make the paper sheet reference position and the apparatus reference position (the surface of the leading edge stopper 3251) coincide with each other.

On that occasion, the control section 101 conducts a controlling operation for moving the position of the leading edge stopper 3251, serving as the paper sheet reference position, in the direction a1, or moving the position of the creasing knife driving section 311 (crease attaching section 310) in the direction a2, so as to implement the paper sheet processing at the paper-sheet processing implementation position being apart from the paper sheet reference position by the predetermined distance designated from the paper-sheet reference position designating screen 103Ga1 indicated in the schematic diagram shown in FIG. 16 (shown in FIG. 17).

Concrete Example (5)

Figure 18:
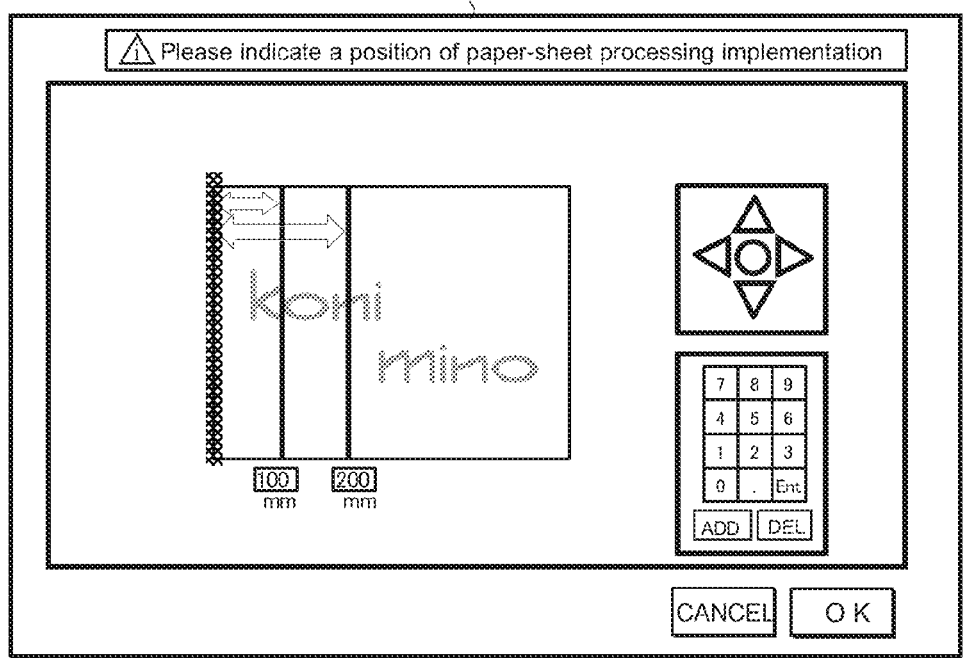
FIG. 18 is an exemplary schematic diagram showing still another exemplified screen to be displayed during an operation of image forming system in accordance with an embodiment of the present invention.

FIG. 18 is still another exemplary schematic diagram indicating both the designation of the paper sheet reference position and the designation of the apparatus reference position, displayed on the display screen 103G. Further, FIG. 19 is still another schematic diagram showing operations to be performed in the crease attaching section 310 in a case where the display screen 103G receives the designations shown in FIG. 18, inputted by the user.

In the schematic diagram shown in FIG. 18, the image is arranged in the horizontally-longer sized paper sheet. Further, in the schematic diagram shown in FIG. 18, in relation to the image, the paper sheet reference position is established as the left-short side of the paper sheet, and the paper-sheet processing implementation position is designated at a position shifting from the paper sheet reference position above-established. When receiving the designations indicated in the schematic diagram shown in FIG. 18, the control section 101 conveys the paper sheet in a state of setting the left-short side of the paper sheet as the leading edge in the conveyance direction thereof, so as to make the paper sheet reference position and the apparatus reference position (the surface of the leading edge stopper 3251) coincide with each other.

Figure 19:
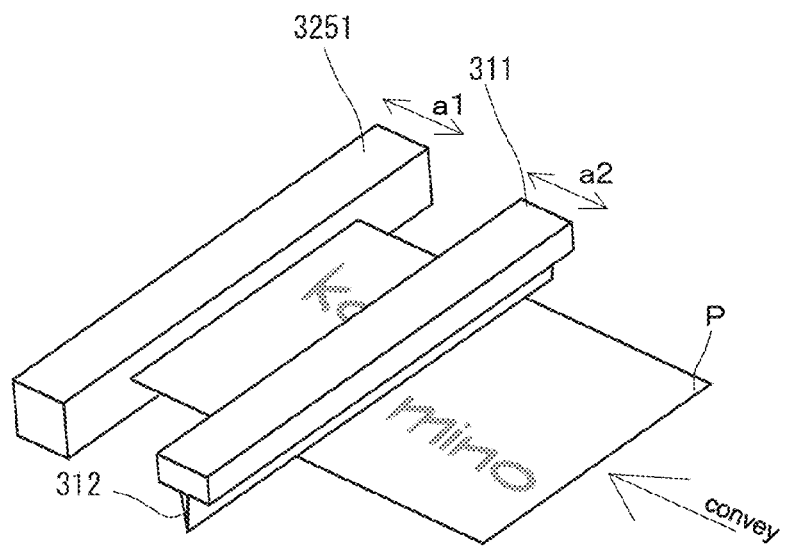
FIG. 19 is a schematic diagram showing a perspective view of still another operating state of the image forming system in accordance with an embodiment of the present invention.

On that occasion, the control section 101 conducts a controlling operation for moving the position of the leading edge stopper 3251, serving as the paper sheet reference position, in the direction a1, or moving the position of the creasing knife driving section 311 (crease attaching section 310) in the direction a2, so as to implement the paper sheet processing at the paper-sheet processing implementation position being apart from the paper sheet reference position by the predetermined distance designated from the paper-sheet reference position designating screen 103Ga1 indicated in the schematic diagram shown in FIG. 18 (shown in FIG. 19).

Concrete Example (6)

Figure 20:
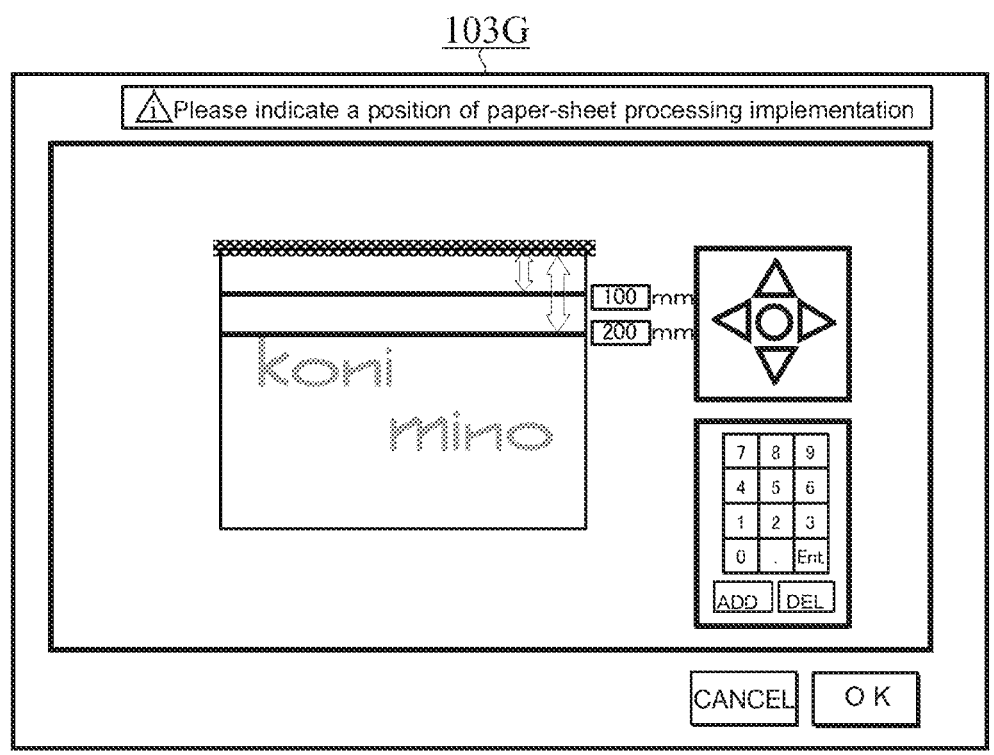
FIG. 20 is an exemplary schematic diagram showing yet another exemplified screen to be displayed during an operation of image forming system in accordance with an embodiment of the present invention.

FIG. 20 is yet another exemplary schematic diagram indicating both the designation of the paper sheet reference position and the designation of the apparatus reference position, displayed on the display screen 103G. Further, FIG. 21 is yet another schematic diagram showing operations to be performed in the crease attaching section 310 in a case where the display screen 103G receives the designations shown in FIG. 20, inputted by the user.

In the schematic diagram shown in FIG. 20, the image is arranged in the horizontally-longer sized paper sheet. Further, in the schematic diagram shown in FIG. 20, in relation to the image, the paper sheet reference position is established as the upper-long side of the paper sheet, and the paper-sheet processing implementation position is designated at a position shifting from the paper sheet reference position above-established. When receiving the designations indicated in the schematic diagram shown in FIG. 20, the control section 101 conveys the paper sheet in a state of setting the upper-long side of the paper sheet as the leading edge in the conveyance direction thereof, so as to make the paper sheet reference position and the apparatus reference position (a surface of the leading edge stopper 3251) coincide with each other.

Figure 21:
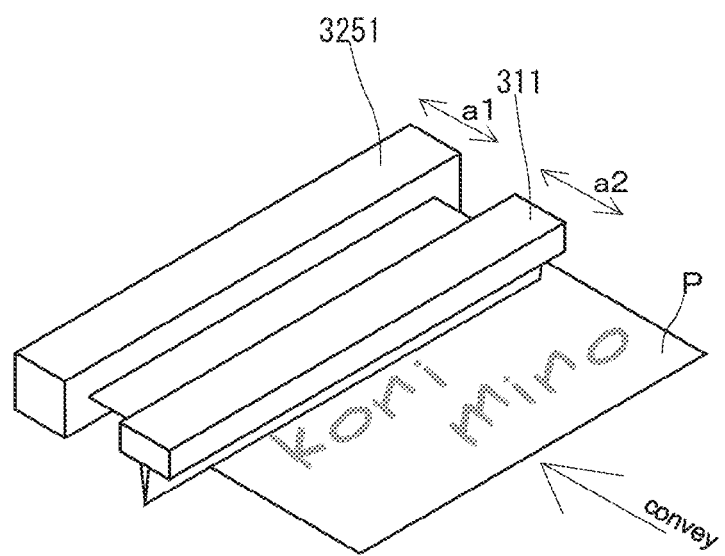
FIG. 21 is a schematic diagram showing a perspective view of yet another operating state of the image forming system in accordance with an embodiment of the present invention.

On that occasion, the control section 101 conducts a controlling operation for moving the position of the leading edge stopper 3251, serving as the paper sheet reference position, in the direction a1, or moving the position of the creasing knife driving section 311 (crease attaching section 310) in direction a2, so as to implement the paper sheet processing at the paper-sheet processing implementation position being apart from the paper sheet reference position by the predetermined distance designated from the paper-sheet reference position designating screen 103Ga1 indicated in the schematic diagram shown in FIG. 20 (shown in FIG. 21).

Other Embodiments

Although the crease processing has been mainly exemplified as the first paper sheet processing in the foregoing, the scope of the present invention is not limited to the preferred embodiment, as aforementioned. For instance, the present invention can be applied to any one of various kinds of paper sheet processing, such as a punch processing, a fold processing, a slit processing, etc. In other words, in a case where a plurality of paper sheet processing is to be implemented in an image forming system in accordance with an embodiment of the present invention, it is possible to apply the present invention to each of the plurality of paper sheet processing.

Effects to be Obtained from Preferred Embodiment (1) According to the image forming system, the method for controlling the image forming system and the non-transitory computer readable storage medium, described in the foregoing, the control section accepts a paper sheet reference position, which is designated at a position within the paper sheet in relation to an arrangement of the image as a reference for designating the paper-sheet processing implementation position, and a designated distance, which is designated as a distance from the paper sheet reference position to the paper-sheet processing implementation position, and controls the paper sheet feeding operation, performed by the paper sheet feeding section, so as to make the apparatus reference position and the paper sheet reference position coincide with each other, and at the same time, the control section controls the image processing section to apply the rotation processing to the image data, so as to set an rotation angle of the image at such a value that makes a conveyance direction of the paper sheet fed from the paper sheet feeding section, an image forming direction of the image formed by the image forming section and a paper sheet direction of the paper sheet processed by the paper sheet processing section, coincide with each other. According to the above-mentioned, both the image forming operation and the paper sheet processing are implemented in the state that the apparatus reference position and the paper sheet reference position coincide with each other. Accordingly, since the paper sheet processing section implements the paper sheet processing at the position being apart from the apparatus reference position, which currently coincides with the paper sheet reference position, by the predetermined distance, it becomes possible to accurately apply the paper sheet processing to the designated position of the paper sheet concerned without being influenced by the shrinkage of the paper sheet size.

(2) In a case where a plurality of paper sheet processing, which are to be applied to the paper sheet by the paper sheet processing section provided in the image forming system, includes a first paper sheet processing, serving as said paper sheet processing, cited in item 1, and a second paper sheet processing being different from the first paper sheet processing, when implementing the second paper sheet processing, the control section determines whether or not it is possible to make the apparatus reference position and the paper sheet reference position coincide with each other, and then, conducts controlling operations for displaying a determination result thereof onto the display section and/or notifying the user of the determination result. According to the above-mentioned, it becomes possible to confirm the fact that the paper sheet processing can be accurately applied to the position designated by the designated distance without being influenced by the shrinkage of the paper sheet size in the state that the apparatus reference position and the paper sheet reference position coincide with each other.

(3) In a case where a plurality of paper sheet processing, which are to be applied to the paper sheet by the paper sheet processing section provided in the image forming system, includes a first paper sheet processing, serving as said paper sheet processing, cited in item 1 or 2, and a second paper sheet processing being different from the first paper sheet processing, when implementing the second paper sheet processing, the control section determines whether or not it is possible to make the apparatus reference position and the paper sheet reference position coincide with each other. Successively, when determining that it is impossible to make the apparatus reference position and the paper sheet reference position coincide with each other, the control section disables any one of the first paper sheet processing and the second paper sheet processing. According to the above-mentioned, since the paper sheet processing is not implemented in the state that the apparatus reference position and the paper sheet reference position do not coincide with each other, it becomes possible to exclude an implementation of inaccurate paper sheet processing influenced by the shrinkage of the paper sheet size.

(4) In a case where a plurality of paper sheet processing, which are to be applied to the paper sheet by the paper sheet processing section provided in the image forming system, includes a first paper sheet processing, serving as said paper sheet processing, cited in item 1, and a second paper sheet processing being different from the first paper sheet processing, the control section determines whether or not the paper sheet, to which both the first paper sheet processing and the second paper sheet processing can be applied in a state that the apparatus reference position and the paper sheet reference position are made to coincide with each other, exists in the paper sheet feeding section, and then, conducts controlling operations for displaying a determination result thereof onto the display section and/or notifying the user of the determination result. According to the above-mentioned, it becomes possible to confirm the fact that the paper sheet processing can be accurately applied to the position designated by the designated distance without being influenced by the shrinkage of the paper sheet size in the state that the apparatus reference position and the paper sheet reference position coincide with each other.

(5) In a case where a plurality of paper sheet processing, which are to be applied to the paper sheet by the paper sheet processing section provided in the image forming system, includes a first paper sheet processing, serving as said paper sheet processing, cited in item 1 or 2, and a second paper sheet processing being different from the first paper sheet processing, the control section determines whether or not the paper sheet, to which both the first paper sheet processing and the second paper sheet processing can be applied in a state that the apparatus reference position and the paper sheet reference position are made to coincide with each other, exists in the paper sheet feeding section. Successively, when determining that the paper sheet concerned does not exists in the paper sheet feeding section, the control section disables any one of the first paper sheet processing and the second paper sheet processing.

While the preferred embodiments of the present invention have been described using specific term, such description is for illustrative purpose only, and it is to be understood that changes and variations may be made without departing from the spirit and scope of the appended claims.

What is claimed is:

1. An image forming system, comprising:
    a paper sheet feeding section that performs a paper sheet feeding operation for feeding a paper sheet accommodated therein;
    an image processing section that applies image processing including an image rotation processing to image data representing an image to be formed onto the paper sheet;
    an image forming section that performs an image forming operation for forming the image represented by processed image data that is acquired by applying the image processing to the image data in the image processing section;
    a paper sheet processing section that applies a paper sheet processing to the paper sheet at a paper-sheet processing implementation position being apart from an apparatus reference position by a predetermined distance; and
    a control section that controls the paper sheet feeding operation, the image processing, the image forming operation and the paper sheet processing, which are to be performed by the paper sheet feeding section, the image processing section, the image forming section and the paper sheet processing section, respectively;
    wherein the control section accepts a paper sheet reference position, which is designated at a position within the paper sheet in relation to an arrangement of the image as a reference for designating the paper-sheet processing implementation position, and a designated distance, which is designated as a distance from the paper sheet reference position to the paper-sheet processing implementation position; and
    wherein the control section controls the paper sheet feeding operation, performed by the paper sheet feeding section, so as to make the apparatus reference position and the paper sheet reference position coincide with each other; and
    wherein the control section controls the image processing section to apply the rotation processing to the image data, so as to set an rotation angle of the image at such a value that makes a conveyance direction of the paper sheet fed from the paper sheet feeding section, an image forming direction of the image formed by the image forming section and a paper sheet direction of the paper sheet processed by the paper sheet processing section, coincide with each other.

2. The image forming system of claim 1,
    wherein a plurality of paper sheet processing, which are to be applied to the paper sheet by the paper sheet processing section, includes a first paper sheet processing, serving as the paper sheet processing, and a second paper sheet processing being different from the paper sheet processing; and
    wherein, in a case where implementing the second paper sheet processing, the control section determines whether or not it is possible to make the apparatus reference position and the paper sheet reference position coincide with each other, and then, conducts controlling operations for displaying a determination result thereof onto a display section and/or notifying a user of the determination result.

3. The image forming system of claim 1,
    wherein a plurality of paper sheet processing, which are to be applied to the paper sheet by the paper sheet processing section, includes a first paper sheet processing, serving as the paper sheet processing, and a second paper sheet processing being different from the paper sheet processing; and
    wherein, in a case where implementing the second paper sheet processing, the control section determines whether or not it is possible to make the apparatus reference position and the paper sheet reference position coincide with each other; and
    wherein, when determining that it is impossible to make the apparatus reference position and the paper sheet reference position coincide with each other, the control section disables any one of the first paper sheet processing and the second paper sheet processing.

4. The image forming system of claim 1,
    wherein a plurality of paper sheet processing, which are to be applied to the paper sheet by the paper sheet processing section, includes a first paper sheet processing, serving as the paper sheet processing, and a second paper sheet processing being different from the paper sheet processing; and
    wherein the control section determines whether or not the paper sheet, to which both the first paper sheet processing and the second paper sheet processing can be applied in a state that the apparatus reference position and the paper sheet reference position are made to coincide with each other, exists in the paper sheet feeding section, and then, conducts controlling operations for displaying a determination result thereof onto a display section and/or notifying a user of the determination result.

5. The image forming system of claim 1,
wherein a plurality of paper sheet processing, which are to be applied to the paper sheet by the paper sheet processing section, includes a first paper sheet processing, serving as the paper sheet processing, and a second paper sheet processing being different from the paper sheet processing; and
wherein the control section determines whether or not the paper sheet, to which both the first paper sheet processing and the second paper sheet processing can be applied in a state that the apparatus reference position and the paper sheet reference position are made to coincide with each other, exists in the paper sheet feeding section; and
wherein, when determining that the paper sheet concerned does not exists in the paper sheet feeding section, the control section disables any one of the first paper sheet processing and the second paper sheet processing.

6. A method for controlling an image forming system that includes: a paper sheet feeding section that performs a paper sheet feeding operation for feeding a paper sheet accommodated therein; an image processing section that applies image processing including an image rotation processing to image data representing an image to be formed onto the paper sheet; an image forming section that performs an image forming operation for forming the image represented by processed image data that is acquired by applying the image processing to the image data in the image processing section; a paper sheet processing section that applies a paper sheet processing to the paper sheet at a paper-sheet processing implementation position being apart from an apparatus reference position by a predetermined distance; and a control section that controls the paper sheet feeding operation, the image processing, the image forming operation and the paper sheet processing, which are to be performed by the paper sheet feeding section, the image processing section, the image forming section and the paper sheet processing section, respectively, the method comprising:
accepting a paper sheet reference position, which is designated at a position within the paper sheet in relation to an arrangement of the image as a reference for designating the paper-sheet processing implementation position, and a designated distance, which is designated as a distance from the paper sheet reference position to the paper-sheet processing implementation position;
controlling the paper sheet feeding operation, performed by the paper sheet feeding section, so as to make the apparatus reference position and the paper sheet reference position coincide with each other; and
controlling the image processing section to apply the rotation processing to the image data, so as to set an rotation angle of the image at such a value that makes a conveyance direction of the paper sheet fed from the paper sheet feeding section, an image forming direction of the image formed by the image forming section and a paper sheet direction of the paper sheet processed by the paper sheet processing section, coincide with each other.

7. The method of claim 6,
wherein a plurality of paper sheet processing, which are to be applied to the paper sheet by the paper sheet processing section, includes a first paper sheet processing, serving as the paper sheet processing, and a second paper sheet processing being different from the paper sheet processing; and
wherein, in a case where implementing the second paper sheet processing, the control section determines whether or not it is possible to make the apparatus reference position and the paper sheet reference position coincide with each other, and then, conducts controlling operations for displaying a determination result thereof onto a display section and/or notifying a user of the determination result.

8. The method of claim 6,
wherein a plurality of paper sheet processing, which are to be applied to the paper sheet by the paper sheet processing section, includes a first paper sheet processing, serving as the paper sheet processing, and a second paper sheet processing being different from the paper sheet processing; and
wherein, in a case where implementing the second paper sheet processing, the control section determines whether or not it is possible to make the apparatus reference position and the paper sheet reference position coincide with each other; and
wherein, when determining that it is impossible to make the apparatus reference position and the paper sheet reference position coincide with each other, the control section disables any one of the first paper sheet processing and the second paper sheet processing.

9. The method of claim 6,
wherein a plurality of paper sheet processing, which are to be applied to the paper sheet by the paper sheet processing section, includes a first paper sheet processing, serving as the paper sheet processing, and a second paper sheet processing being different from the paper sheet processing; and
wherein the control section determines whether or not the paper sheet, to which both the first paper sheet processing and the second paper sheet processing can be applied in a state that the apparatus reference position and the paper sheet reference position are made to coincide with each other, exists in the paper sheet feeding section, and then, conducts controlling operations for displaying a determination result thereof onto a display section and/or notifying a user of the determination result.

10. The image forming system of claim 1,
wherein a plurality of paper sheet processing, which are to be applied to the paper sheet by the paper sheet processing section, includes a first paper sheet processing, serving as the paper sheet processing, and a second paper sheet processing being different from the paper sheet processing; and
wherein the control section determines whether or not the paper sheet, to which both the first paper sheet processing and the second paper sheet processing can be applied in a state that the apparatus reference position and the paper sheet reference position are made to coincide with each other, exists in the paper sheet feeding section; and
wherein, when determining that the paper sheet concerned does not exists in the paper sheet feeding section, the control section disables any one of the first paper sheet processing and the second paper sheet processing.

11. A non-transitory computer readable storage medium storing a computer executable program for controlling an image forming system that includes: a paper sheet feeding section that performs a paper sheet feeding operation for feeding a paper sheet accommodated therein; an image processing section that applies image processing including an image rotation processing to image data representing an image to be formed onto the paper sheet; an image forming section that performs an image forming operation for forming the image represented by processed image data that is acquired by applying the image processing to the image data in the image processing section; a paper sheet processing section that applies a paper sheet processing to the paper sheet at a paper-sheet processing implementation position being apart from an apparatus reference position by a predetermined distance; and a control section that controls the paper sheet feeding operation, the image processing, the image forming operation and the paper sheet processing, which are to be performed by the paper sheet feeding section, the image processing section, the image forming section and the paper sheet processing section, respectively, the program being executable by a computer to cause the computer to perform a process comprising:

accepting a paper sheet reference position, which is designated at a position within the paper sheet in relation to an arrangement of the image as a reference for designating the paper-sheet processing implementation position, and a designated distance, which is designated as a distance from the paper sheet reference position to the paper-sheet processing implementation position;

controlling the paper sheet feeding operation, performed by the paper sheet feeding section, so as to make the apparatus reference position and the paper sheet reference position coincide with each other; and controlling the image processing section to apply the rotation processing to the image data, so as to set an rotation angle of the image at such a value that makes a conveyance direction of the paper sheet fed from the paper sheet feeding section, an image forming direction of the image formed by the image forming section and a paper sheet direction of the paper sheet processed by the paper sheet processing section, coincide with each other.

12. The non-transitory computer readable storage medium of claim 11, wherein a plurality of paper sheet processing, which are to be applied to the paper sheet by the paper sheet processing section, includes a first paper sheet processing, serving as the paper sheet processing, and a second paper sheet processing being different from the paper sheet processing; and wherein, in a case where implementing the second paper sheet processing, the control section determines whether or not it is possible to make the apparatus reference position and the paper sheet reference position coincide with each other, and then, conducts controlling operations for displaying a determination result thereof onto a display section and/or notifying a user of the determination result.

13. The non-transitory computer readable storage medium of claim 11, wherein a plurality of paper sheet processing, which are to be applied to the paper sheet by the paper sheet processing section, includes a first paper sheet processing, serving as the paper sheet processing, and a second paper sheet processing being different from the paper sheet processing; and wherein, in a case where implementing the second paper sheet processing, the control section determines whether or not it is possible to make the apparatus reference position and the paper sheet reference position coincide with each other; and wherein, when determining that it is impossible to make the apparatus reference position and the paper sheet reference position coincide with each other, the control section disables any one of the first paper sheet processing and the second paper sheet processing.

14. The non-transitory computer readable storage medium of claim 11, wherein a plurality of paper sheet processing, which are to be applied to the paper sheet by the paper sheet processing section, includes a first paper sheet processing, serving as the paper sheet processing, and a second paper sheet processing being different from the paper sheet processing; and wherein the control section determines whether or not the paper sheet, to which both the first paper sheet processing and the second paper sheet processing can be applied in a state that the apparatus reference position and the paper sheet reference position are made to coincide with each other, exists in the paper sheet feeding section, and then, conducts controlling operations for displaying a determination result thereof onto a display section and/or notifying a user of the determination result.

15. The non-transitory computer readable storage medium of claim 11, wherein a plurality of paper sheet processing, which are to be applied to the paper sheet by the paper sheet processing section, includes a first paper sheet processing, serving as the paper sheet processing, and a second paper sheet processing being different from the paper sheet processing; and wherein the control section determines whether or not the paper sheet, to which both the first paper sheet processing and the second paper sheet processing can be applied in a state that the apparatus reference position and the paper sheet reference position are made to coincide with each other, exists in the paper sheet feeding section; and wherein, when determining that the paper sheet concerned does not exists in the paper sheet feeding section, the control section disables any one of the first paper sheet processing and the second paper sheet processing.

* * * * *